United States Patent
Puri et al.

(10) Patent No.: US 10,338,892 B2
(45) Date of Patent: Jul. 2, 2019

(54) DYNAMIC PROVISIONING OF A SET OF TOOLS BASED ON PROJECT SPECIFICATIONS

(71) Applicant: Accenture Global Solutions Limited, Dublin (IE)

(72) Inventors: Manhar Puri, Mumbai (IN); Unmesh Salgaonkar, Mumbai (IN); Nitin Madhukar Sawant, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 57 days.

(21) Appl. No.: 15/358,721

(22) Filed: Nov. 22, 2016

(65) Prior Publication Data
US 2018/0143808 A1    May 24, 2018

(51) Int. Cl.
| | | |
|---|---|---|
| G06F 8/61 | (2018.01) | |
| G06F 9/445 | (2018.01) | |
| G06Q 10/06 | (2012.01) | |
| G06F 8/20 | (2018.01) | |
| G06F 8/30 | (2018.01) | |

(52) U.S. Cl.
CPC ............... *G06F 8/30* (2013.01); *G06F 8/20* (2013.01); *G06F 8/61* (2013.01); *G06Q 10/0631* (2013.01); *G06F 9/44505* (2013.01)

(58) Field of Classification Search
CPC ..... G06F 8/20; G06F 8/30; G06F 8/61; G06F 9/44505
See application file for complete search history.

(56) References Cited

U.S. PATENT DOCUMENTS

| | | | | |
|---|---|---|---|---|
| 6,775,830 B1 * | 8/2004 | Matsunami | ............... | G06F 8/61 717/174 |
| 7,631,006 B2 * | 12/2009 | Hagstrom | ................ | G06F 8/20 |
| 7,926,051 B2 * | 4/2011 | Barta | ........................ | G06F 8/61 717/174 |
| 8,074,214 B2 * | 12/2011 | Isaacson | ................... | G06F 8/61 717/173 |
| 8,819,670 B2 * | 8/2014 | Braun | ....................... | G06F 8/63 717/174 |

(Continued)

OTHER PUBLICATIONS

Wikipedia, "Patch (computing)," https://en.wikipedia.org/wiki/Patch_(computing), Nov. 15, 2016, 5 pages.

(Continued)

*Primary Examiner* — Chat C Do
*Assistant Examiner* — Douglas M Slachta
(74) *Attorney, Agent, or Firm* — Harrity & Harrity, LLP

(57) ABSTRACT

A device may receive project information that identifies a set of tools to be provisioned on multiple devices. The multiple devices may be used during a project. The device may process the project information to identify the set of tools based on receiving the project information. The set of tools may include different tools associated with different roles related to the project. The device may provide tool information related to installing or configuring the set of tools on the multiple devices based on processing the project information. The tool information provided to a first device of the multiple devices may relate to the first device and not to a second device of the multiple devices.

20 Claims, 19 Drawing Sheets

(56) References Cited

U.S. PATENT DOCUMENTS

| | | | | |
|---|---|---|---|---|
| 8,918,781 B1* | 12/2014 | Dubey | | G06F 8/60 |
| | | | | 717/127 |
| 9,454,354 B2* | 9/2016 | Kumar | | G06F 8/61 |
| 9,563,854 B2* | 2/2017 | Cruz Mota | | G06N 3/08 |
| 2006/0259897 A1* | 11/2006 | Zorn | | G06F 8/20 |
| | | | | 717/118 |
| 2007/0220479 A1* | 9/2007 | Hughes | | G06F 8/00 |
| | | | | 717/100 |
| 2008/0263505 A1* | 10/2008 | StClair | | G06F 8/10 |
| | | | | 717/101 |
| 2011/0035323 A1* | 2/2011 | Hamilton | | G06Q 10/06 |
| | | | | 705/301 |
| 2011/0191768 A1* | 8/2011 | Smith | | G06F 9/445 |
| | | | | 717/176 |
| 2012/0102450 A1* | 4/2012 | Choudhary | | G06F 8/77 |
| | | | | 717/101 |
| 2012/0137286 A1 | 5/2012 | Schimpf et al. | | |
| 2013/0347076 A1* | 12/2013 | Marum | | G06F 21/12 |
| | | | | 726/4 |
| 2014/0289722 A1* | 9/2014 | Hoy | | G06F 8/61 |
| | | | | 717/174 |
| 2015/0074659 A1* | 3/2015 | Madsen | | G06F 8/61 |
| | | | | 717/177 |
| 2015/0121361 A1* | 4/2015 | Li | | G06F 8/61 |
| | | | | 717/175 |
| 2015/0277886 A1* | 10/2015 | Bronheim | | G06F 8/61 |
| | | | | 717/174 |
| 2016/0283893 A1* | 9/2016 | Dhiman | | G06F 8/20 |

OTHER PUBLICATIONS

SoloWizard, "SoloWizard," http://www.solowizard.com/, Oct. 28, 2012, 7 pages.

Chef, "Chef," https://www.chef.io/chef/, Nov. 14, 2016, 9 pages.

* cited by examiner

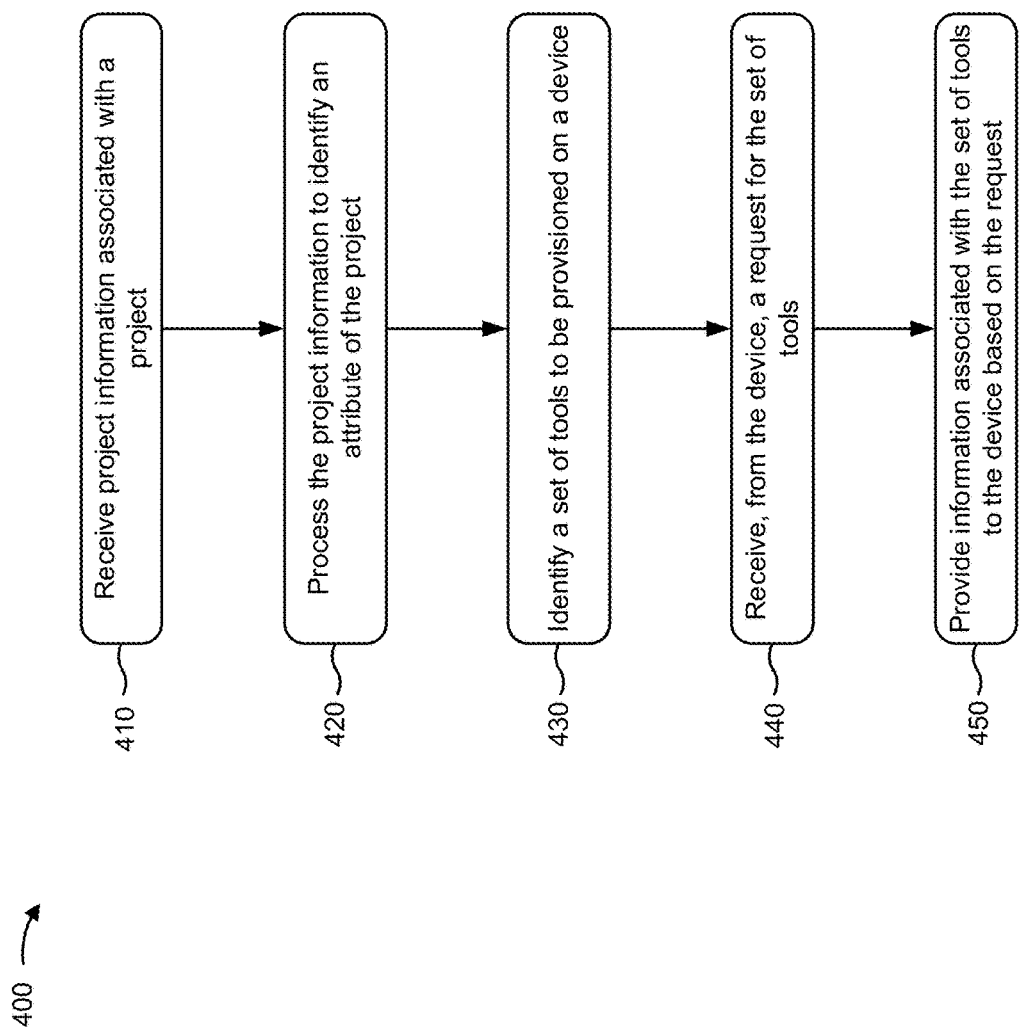

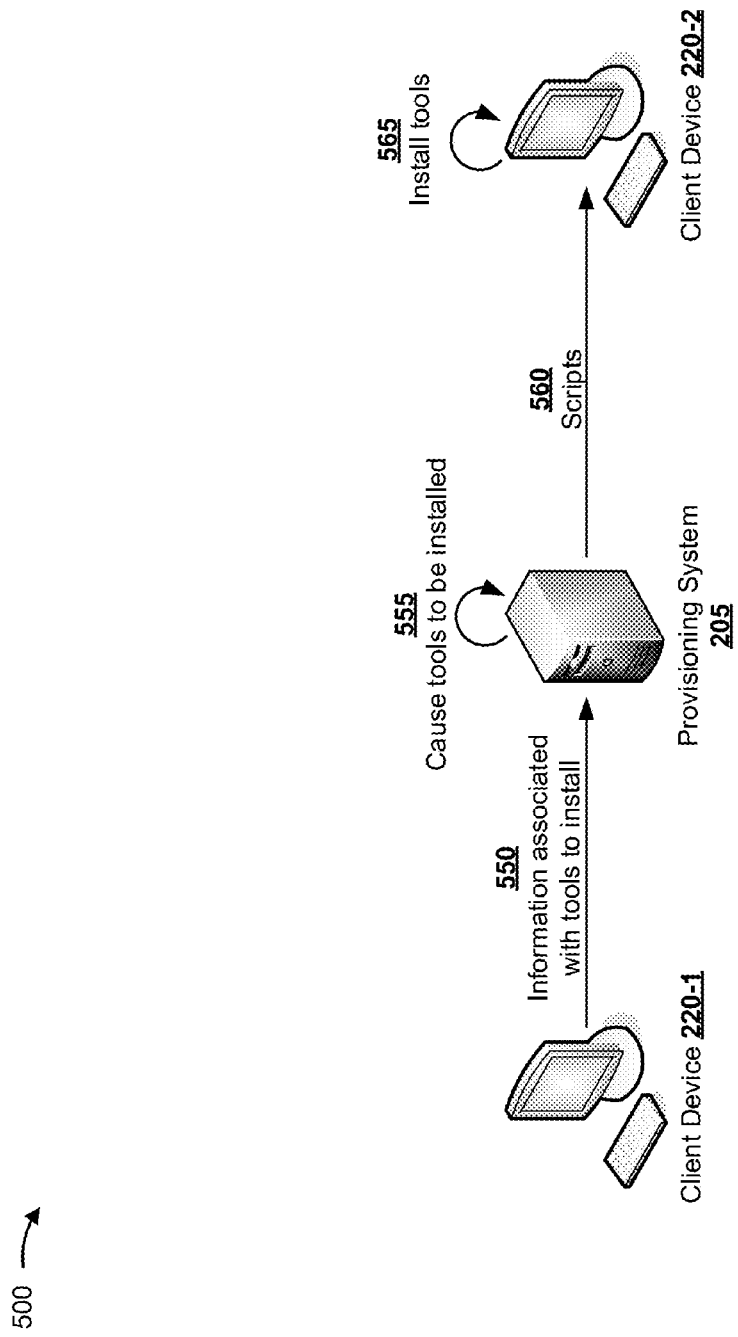

DYNAMIC PROVISIONING OF A SET OF TOOLS BASED ON PROJECT SPECIFICATIONS

BACKGROUND

A number of different tools may be utilized in a software development environment to perform a variety of functions important to development of the software. For example, such tools may provide an integrated development environment, source code management, unit/functional testing, continuous integration, or the like. In some cases, different members of a software development team may use different sets of tools.

SUMMARY

According to some possible implementations, a device may include one or more processors to receive project information associated with a project. The project information may include information related to a set of specifications associated with the project, and a set of descriptions associated with roles for the project. The one or more processors may process the project information to identify an attribute of the project based on receiving the project information. The one or more processors may identify a set of tools to be provisioned on another device based on processing the project information. The set of tools may be associated with the set of specifications and the set of descriptions. The one or more processors may receive, from the other device, a request for the set of tools. The one or more processors may provide tool information associated with the set of tools to the other device based on the request.

According to some possible implementations, a method may include receiving, by a device, project information associated with a project. The project information may identify an attribute of the project related to a specification of the project, or a role associated with the project. The method may include processing, by the device, the project information to identify the attribute of the project. The method may include identifying, by the device, one or more tools for a set of devices based on identifying the attribute of the project. The one or more tools may be different for different devices of the set of devices. The method may include receiving, from the set of devices, a request for the one or more tools for the set of devices. The method may include providing, by the device, tool information to permit the set of devices to obtain or install the one or more tools.

According to some possible implementations, a non-transitory computer-readable medium may store one or more instructions that, when executed by one or more processors, cause the one or more processors to receive project information that identifies a set of tools to be provisioned on multiple devices. The multiple devices may be used during a project. The one or more instructions may cause the one or more processors to process the project information to identify the set of tools based on receiving the project information. The set of tools may include different tools associated with different roles related to the project. The one or more instructions may cause the one or more processors to provide tool information related to installing or configuring the set of tools on the multiple devices based on processing the project information. The tool information provided to a first device of the multiple devices may relate to the first device and not to a second device of the multiple devices.

BRIEF DESCRIPTION OF THE DRAWINGS

FIG. 4 is a flow chart of an example process for dynamically provisioning a set of tools based on project specifications and/or descriptions:

FIGS. 5A-5F are diagrams of an example implementation relating to the process shown in FIG. 4, and FIGS. 6A-6F are diagrams of an example implementation relating to the process shown in FIG. 4.

DETAILED DESCRIPTION

The following detailed description of example implementations refers to the accompanying drawings. The same reference numbers in different drawings may identify the same or similar elements.

In a software development environment, a development team may be tasked with developing software and/or an application. In this case, members of the development team may need access to different tools depending on roles and/or responsibilities of the members. In addition, the development team may need access to a set of tools that is different from another development team tasked with developing different software and/or a different application.

Implementations described herein provide a provisioning system that may automatically identify tools needed by a development team based on project requirements. Furthermore, the provisioning system may dynamically and automatically provision the tools on client devices of members of the development team. Additionally, the provisioning system may cause parallel installation of different sets of tools on different client devices.

In this way, the provisioning system increases an efficiency of dynamically installing different sets of tools. For example, the provisioning system conserves memory resources by reducing or eliminating installation of tools that are not needed. Additionally, the provisioning system conserves processing resources by reducing or eliminating installation of tools that are not needed. Furthermore, the provisioning system reduces an amount of time needed to install sets of tools on multiple client devices by enabling parallel installation on different client devices.

Figure 1A:
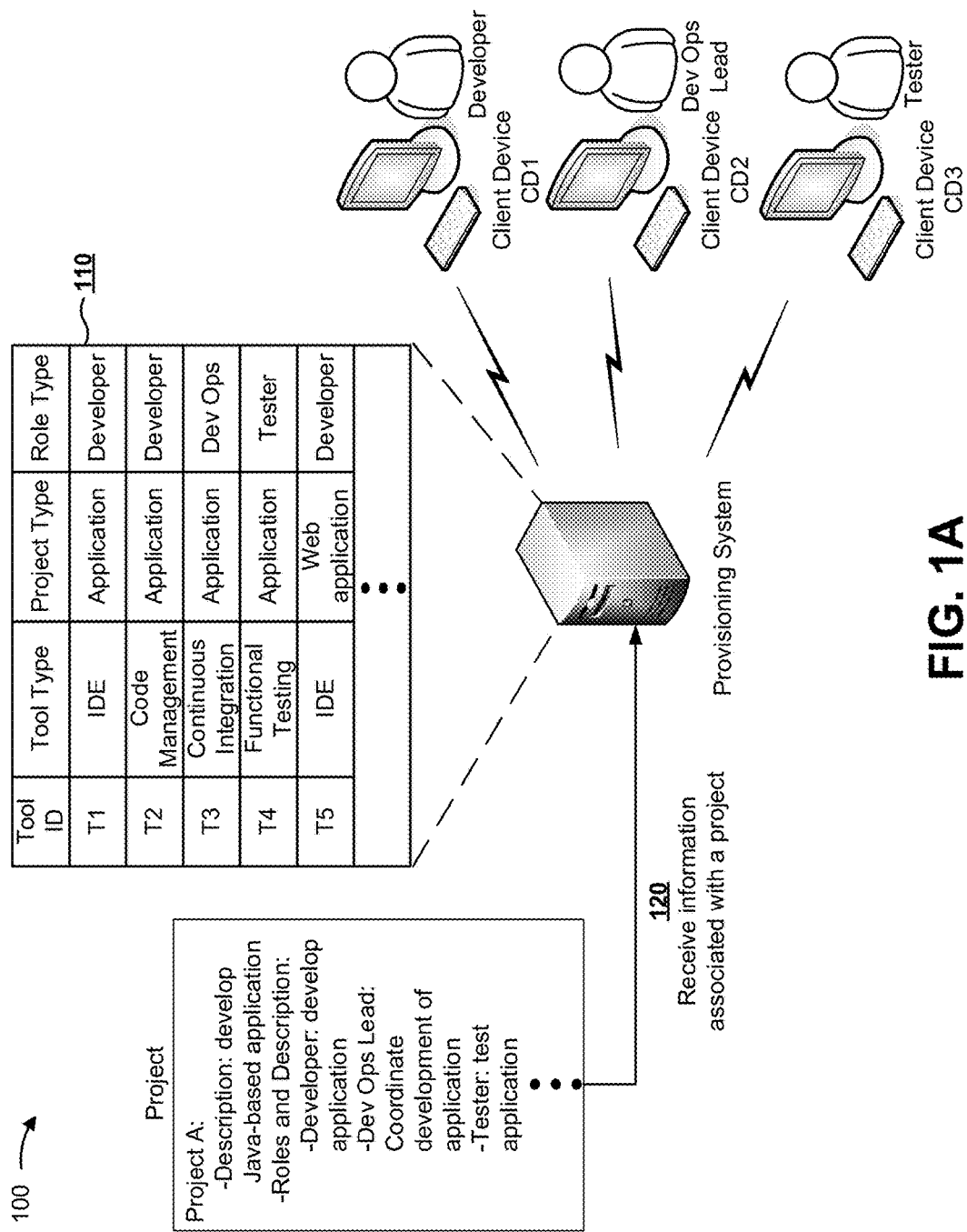
FIGS. 1A-1D are diagrams of an overview of an example implementation described herein.

FIGS. 1A-1D are diagrams of an overview of an example implementation 100 described herein. As shown in FIG. 1A, example implementation 100 may include a provisioning system, which may communicate with client devices, such as CD1 (associated with a Developer), CD2 (associated with a development operations, or Dev Ops, lead), and CD3 (associated with a Tester). As shown by reference number 110, the provisioning system may store tool information related to a set of tools. For example, the set of tools may be used by a development team, which may include the Developer associated with CD1, the Dev Ops lead associated with CD2, and/or the Tester associated with CD3.

The tool information may include (e.g., for each tool of the set of tools) information that indicates a tool identifier that identifies the tool, a tool type that identifies a type of the tool, a project type that identifies a type of project for which the tool may be used, and/or a role type that identifies a type of role (e.g., user) that may use the tool. For example, as shown, tool "T4" may be a "Functional Testing" type tool that may be used for "Application" type projects in a "Tester" type role.

As shown by reference number 120, the provisioning system may receive (e.g., in a document containing text) project information associated with a project (e.g., a development project). The project information may identify project requirements or specifications, role types needed for the project, or the like.

Figure 1B:
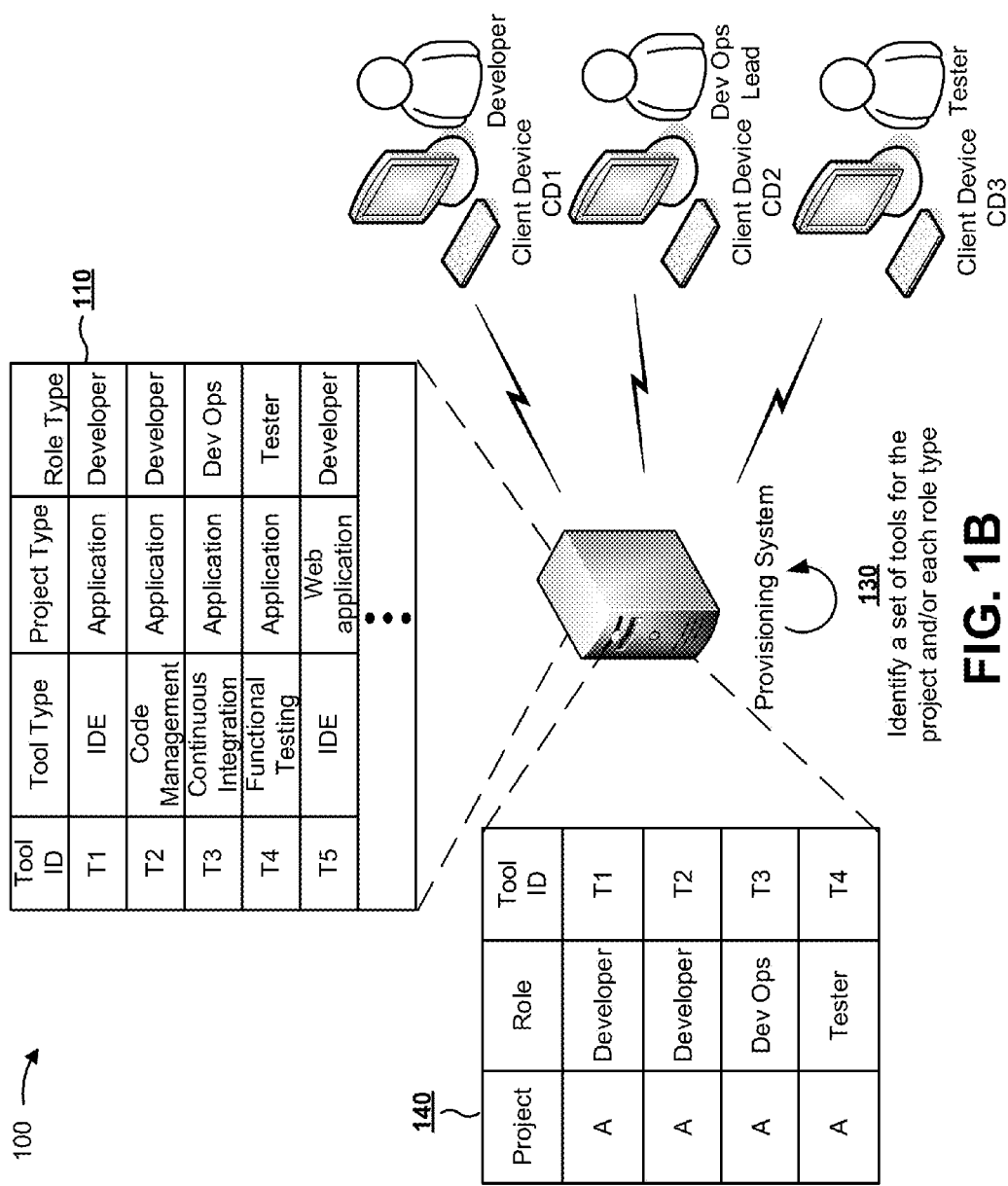

As shown in FIG. 1B, and as shown by reference number 130, the provisioning system may process the project information to identify a set of tools (shown by reference number 140) for the project, for each role type associated with the project, and/or the like. For example, the provisioning system may use natural language processing, machine learning, artificial intelligence, etc., to identify terms and/or tags from the project information, and may identify the set of tools based on the identified terms and/or tags.

Additionally, the provisioning system may identify which tools are to be installed on which different client devices based on the role type or user associated with each client device. For example, the provisioning system may identify that tool T4 is to be installed on a client device of a tester based on the "Tester" role associated with tool T4.

Figure 1C:
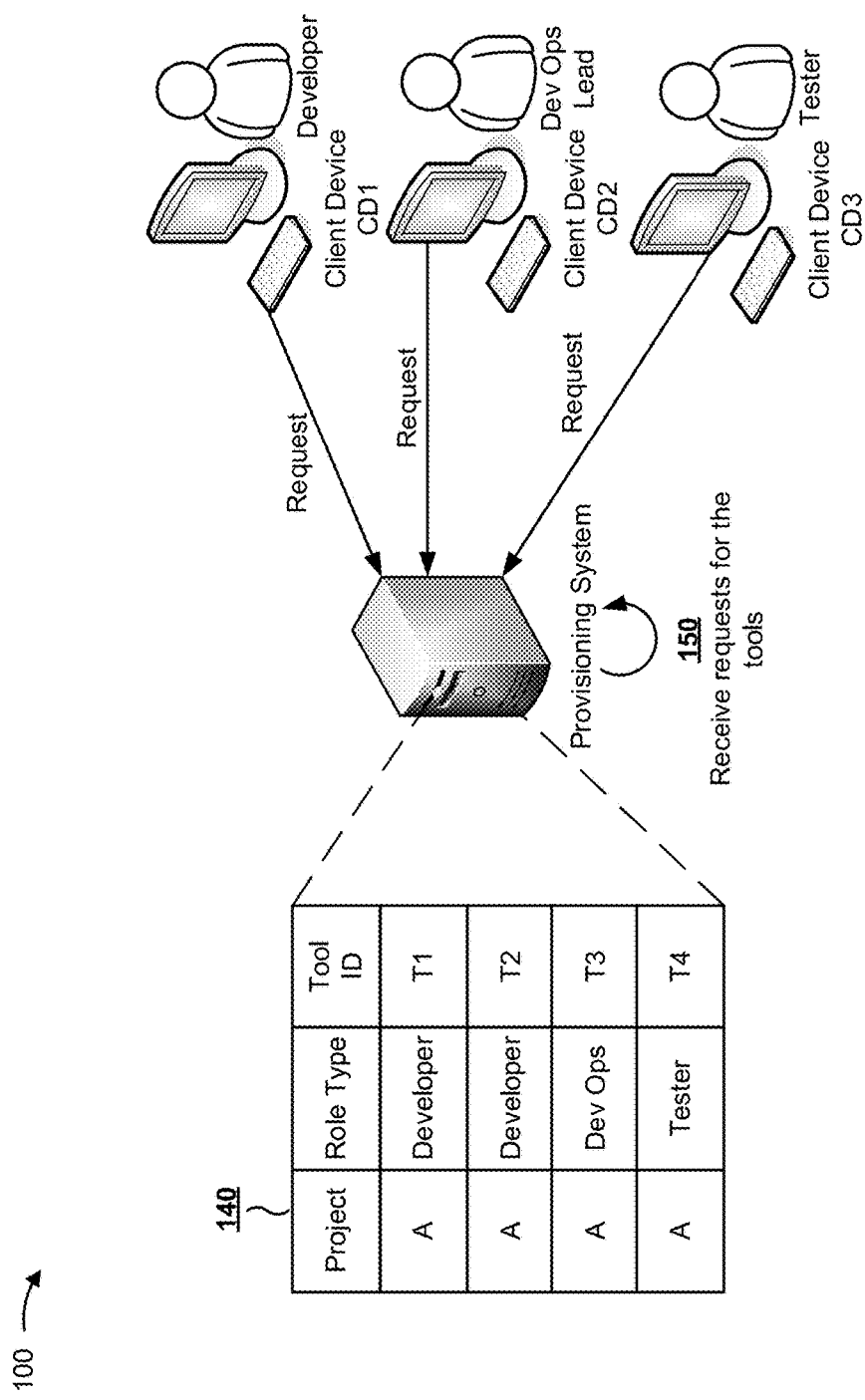

As shown in FIG. 1C, and as shown by reference number 150, the provisioning system may receive requests from client devices for a respective set of tools associated with each of the client devices. The provisioning system may identify which tools are to be provided to each client device (e.g., by matching a role type associated with the client devices and a role type associated with each tool). For example, the provisioning system may determine that tool T4 is to be installed on client device CD3 based on matching both tool T4 and client device CD3 to the "Tester" role.

Figure 1D:
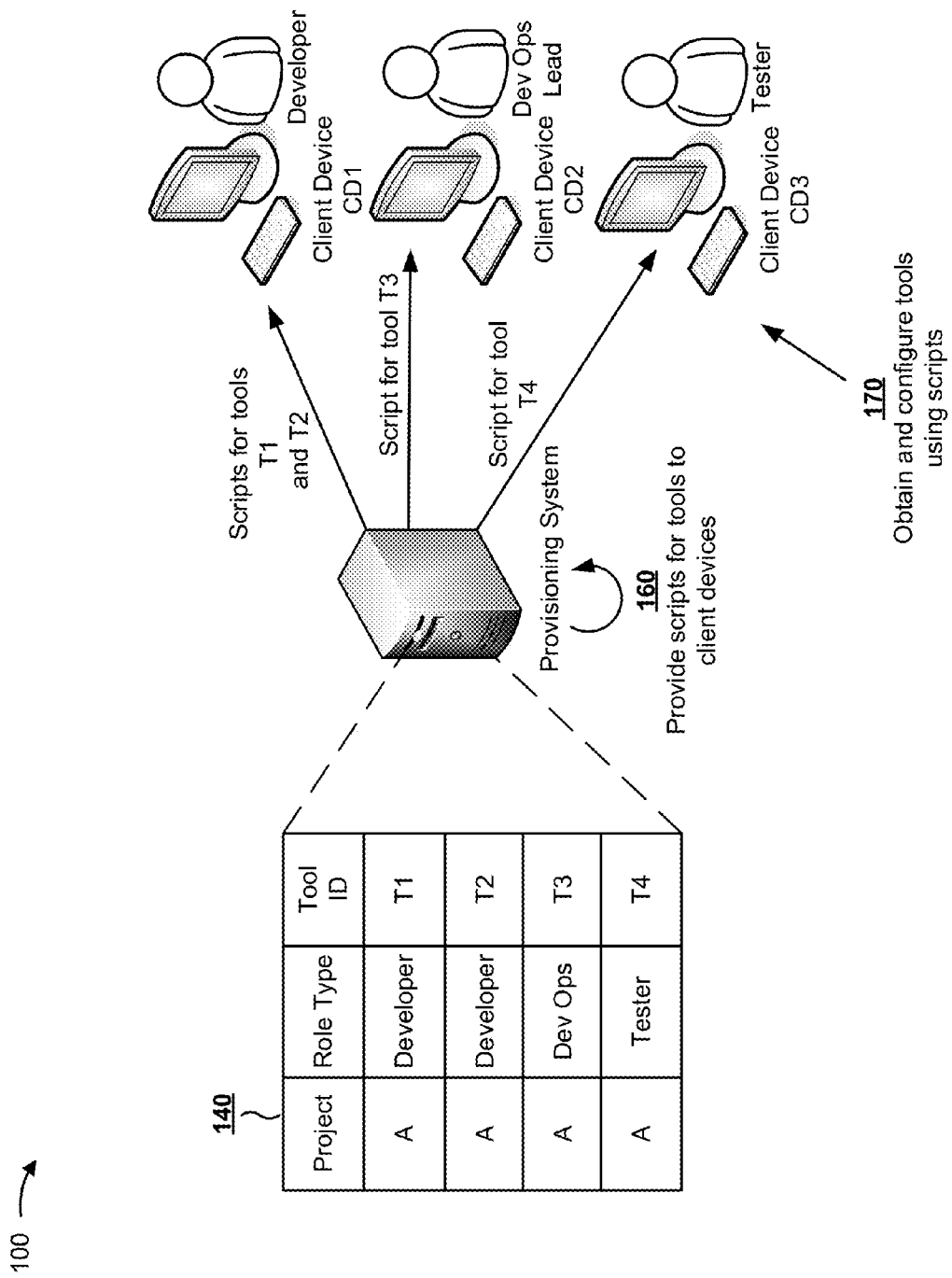

As shown in FIG. 1D, and as shown by reference number 160, the provisioning system may (e.g., based on requests from client devices for a respective set of tools for the client devices) provide scripts to the client devices to enable the client devices to automatically obtain (e.g., download or install) the set of tools and configure the set of tools. As shown by reference number 170, the client devices may obtain and configure the set of tools (e.g., from the provisioning system) using the scripts.

In this way, the provisioning system increases an efficiency of dynamically installing different sets of tools. For example, the provisioning system conserves memory resources by reducing or eliminating installation of tools that are not needed. Additionally, or alternatively, the provisioning system conserves processing resources by reducing or eliminating installation of tools that are not needed. Furthermore, the provisioning system reduces an amount of time needed to install sets of tools on multiple client devices by enabling parallel installation on different client devices.

As indicated above, FIGS. 1A-1D are provided merely as an example. Other examples are possible and may differ from what was described with regard to FIGS. 1A-1D.

Figure 2:
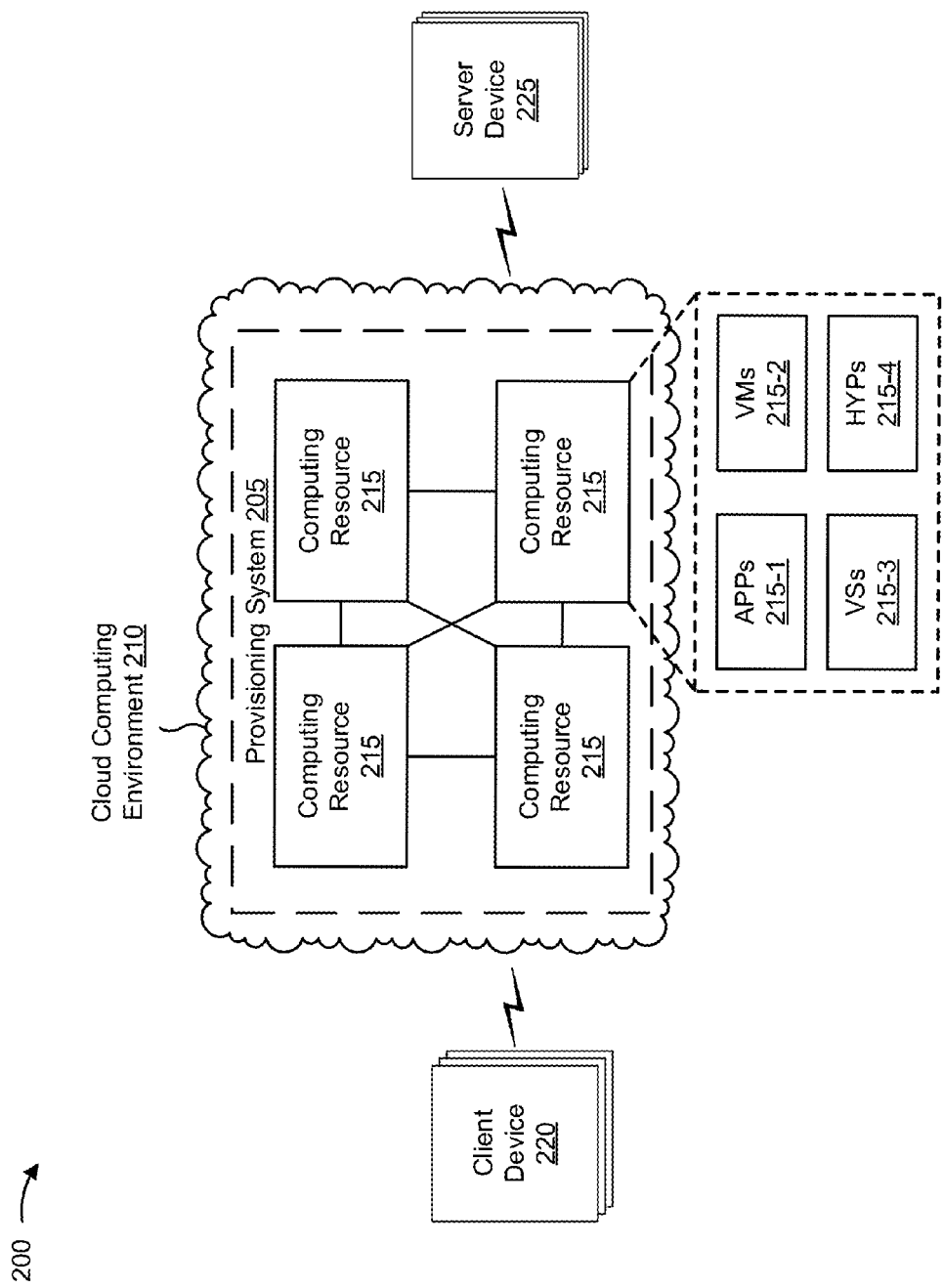
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a provisioning system 205 hosted within a cloud computing environment 210, one or more client devices 220 (referred to collectively as "client devices 220," and individually as client device 220"), and one or more server devices 225 (referred to collectively as "server devices 225," and individually as "server device 225"). Devices of environment 200 may interconnect via wired connections, wireless connections, or a combination of wired and wireless connections.

Provisioning system 205 includes one or more devices capable of receiving, generating, processing, storing, and/or providing information associated with provisioning a set of tools based on project specifications, as described elsewhere herein. For example, provisioning system 205 may include a cloud server or a group of cloud servers. In some implementations, provisioning system 205 may be designed to be modular such that certain software components can be swapped in or out depending on a particular need. As such, provisioning system 205 may be easily and/or quickly reconfigured for different uses.

In some implementations, as shown, provisioning system 205 may be hosted in cloud computing environment 210. Notably, while implementations described herein describe provisioning system 205 as being hosted in cloud computing environment 210, in some implementations, provisioning system 205 may not be cloud-based or may be partially cloud-based.

Cloud computing environment 210 includes an environment that hosts provisioning system 205. Cloud computing environment 210 may provide computation, software, data access, storage, etc. services that do not require end-user (e.g., client device 220) knowledge of a physical location and configuration of system(s) and/or device(s) that hosts provisioning system 205. As shown, cloud computing environment 210 includes a group of computing resources 215 (referred to collectively as "computing resources 215" and individually as "computing resource 215").

Computing resource 215 includes one or more personal computers, workstation computers, server devices, or another type of computation and/or communication device. In some implementations, computing resource 215 may host provisioning system 205. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown by FIG. 2, computing resource 215 includes a group of cloud resources, such as one or more applications ("APPs") 215-1, one or more virtual machines ("VMs") 215-2, one or more virtualized storages ("VSs") 215-3, or one or more hypervisors ("HYPs") 215-4.

Application 215-1 includes one or more software applications that may be provided to or accessed by client device 220. Application 215-1 may eliminate a need to install and execute the software applications on client device 220. For example, application 215-1 may include software associated with provisioning system 205 and/or any other software capable of being provided via cloud computing environment 210. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., client device 220), and may manage infrastructure of cloud computing environment 210, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 may provide hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

Client device 220 includes one or more devices capable of receiving, generating, storing, processing, and/or providing information associated with provisioning a set of tools based on project specifications. For example, client device 220 may include a communication and/or computing device, such as a mobile phone (e.g., a smart phone or a radiotelephone), a laptop computer, a tablet computer, a gaming device, a wearable communication device (e.g., a smart wristwatch, a pair of smart eyeglasses, or an activity band), or a similar type of device. In some implementations, client device 220 may request a set of tools to be provisioned on client device 220 (e.g., from provisioning system 205 and/or server device 225), as described elsewhere herein. Additionally, or alternatively, client device 220 may receive the set of tools or information associated with the set of tools to be provisioned on client device 220, as described elsewhere herein.

Server device 225 includes one or more devices capable of receiving, generating, storing, processing, and/or routing information associated with provisioning a set of tools based on project specifications. For example, server device 225 may include a server (e.g., in a data center or a cloud computing environment), a data center (e.g., a multi-server micro data center), a workstation computer, a virtual machine (VM) provided in a cloud computing environment, a provisioning server that provisions a tool for client device 220 and/or another server device 225, a build server, a continuous integration server, or a similar type of device. In some implementations, server device 225 may include a communication interface that allows server device 225 to receive information from and/or transmit information to other devices in environment 200. In some implementations, server device 225 may receive and/or store information related to a set of tools to be provisioned on client device 220, as described elsewhere herein. Additionally, or alternatively, server device 225 may provide information related to the set of tools to be provisioned on client device 220 (e.g., based on a request for the information), as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
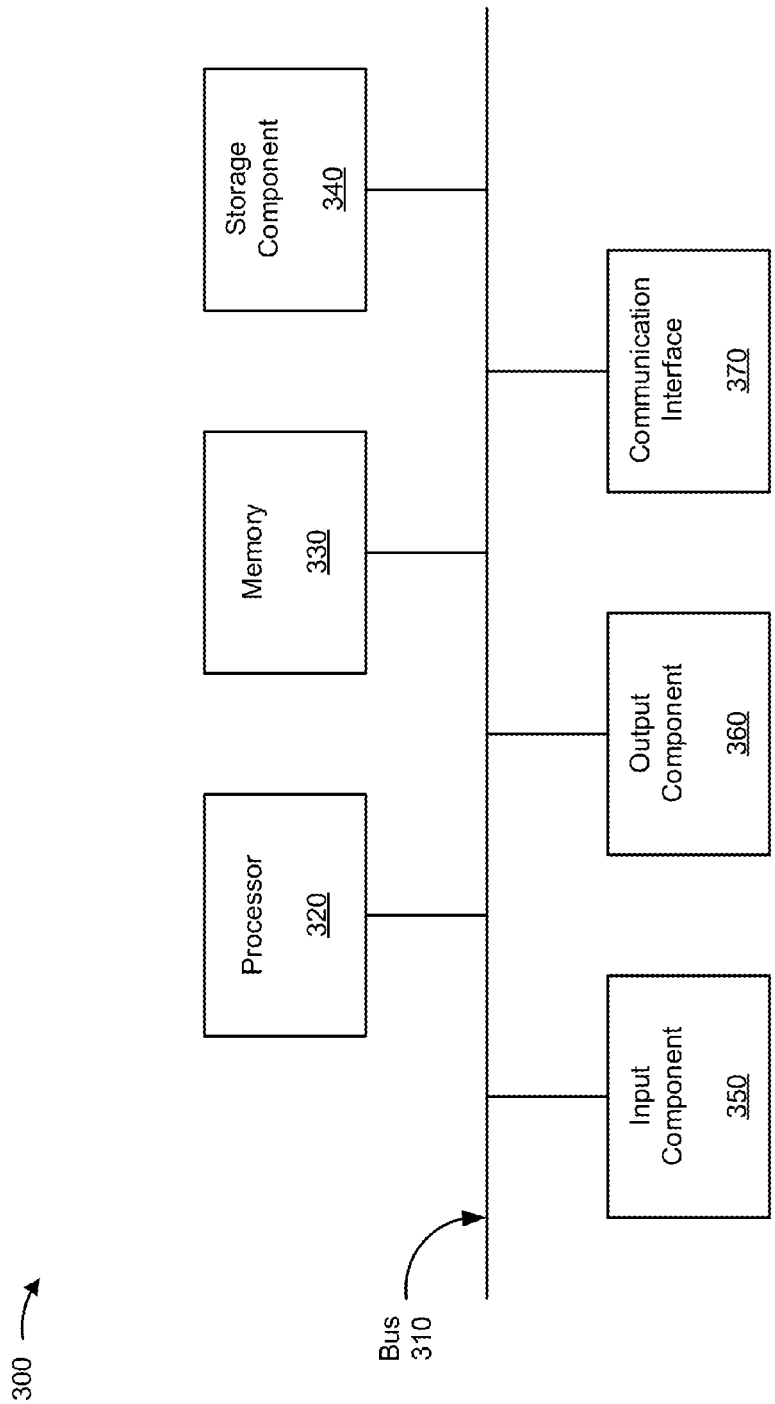
FIG. 3 is a diagram of example components of one or more devices of FIG. 2.

FIG. 3 is a diagram of example components of a device 300. Device 300 may correspond to provisioning system 205, computing resource 215, client device 220, and/or server device 225. In some implementations, provisioning system 205, client device 220, and/or server device 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for dynamically provisioning a set of tools based on project specifications. In some implementations, one or more process blocks of FIG. 4 may be performed by provisioning system 205. In some implementations, one or more process blocks of FIG. 4 may be performed by another device or a group of devices separate from or including provisioning system 205, such as cloud computing environment 210, client device 220, and/or server device 225.

As shown in FIG. 4, process 400 may include receiving project information associated with a project (block 410). For example, provisioning system 205 may receive project information associated with a project. Project information may include information related to project specifications, project requirements, project design, a description of the project, roles that are needed to complete the project, descriptions of the roles, and/or the like. In some implementations, the project information may include text. For example, the project information may include a document with text, such as a text file, a text document, a web document (e.g., a webpage), a file that includes text, or the like.

In some implementations, provisioning system 205 may receive project information from client device 220 and/or server device 225. For example, provisioning system 205 may receive the project information based on user input, such as input by a user of client device 220 via a user interface or a display of client device 220. Additionally, or alternatively, provisioning system 205 may receive the project information periodically, according to a schedule, based on requesting the project information, or the like.

In some implementations, provisioning system 205 may receive information identifying a set of tools to be used for a project and/or particular client devices 220 on which the set of tools are to be provisioned (e.g., rather than receiving project information). For example, provisioning system 205 may receive a text file, a comma-separated values (CSV) file, a spreadsheet (e.g., an excel) file, or the like, that includes information identifying the set of tools and/or the particular client devices 220 on which the set of tools are to be provisioned. In some implementations, provisioning system 205 may receive the information identifying the set of tools from client device 220 (e.g., based on input from a user of client device 220, a selection by a user of client device 220, or the like).

As further shown in FIG. 4, process 400 may include processing the project information to identify an attribute of the project (block 420). For example, provisioning system 205 may identify an attribute of the project based on the project information. An attribute may include a project requirement, a project technical specification, a particular role needed to complete the project, or the like.

In some implementations, provisioning system 205 may identify the attribute of the project based on processing the project information. For example, provisioning system 205 may process the project information when receiving the project information. In some implementations, provisioning system 205 may process the project information to identify terms and/or tags included in the project information. For example, provisioning system 205 may process the project information using natural language processing, text analysis, and/or computational linguistics to identify (e.g., extract) terms, a set of characters, such as a character string, a misspelled word, an acronym, tags, and/or the like. In some implementations, provisioning system 205 may generate a list of unique terms included in the project information. For example, provisioning system 205 may generate a list of unique terms based on identifying the terms and/or the tags.

In some implementations, provisioning system 205 may identify the attribute based on processing the project information (e.g., using the list of unique terms). For example, provisioning system 205 may identify an attribute associated with tags included in the project information. Additionally, or alternatively, provisioning system 205 may identify an attribute associated with the project based on terms included in the project information.

In some implementations, provisioning system 205 may identify the attribute using a data structure that includes attributes associated with terms and/or tags. In some implementations, provisioning system 205 may store the attribute (e.g., using a data structure or memory resources of provisioning system 205).

In some implementations, provisioning system 205 may process a file, such as a text file, a CSV file, or an excel file, from client device 220 (e.g., rather than processing project information to identify an attribute of the project). For example, provisioning system 205 may process a file that includes information identifying a set of tools to be used for a project and/or particular client devices 220 on which the set of tools are to be provisioned.

In this way, provisioning system 205 may quickly and efficiently process project information to identify an attribute of the project.

As further shown in FIG. 4, process 400 may include identifying a set of tools to be provisioned on a device (block 430). For example, provisioning system 205 may identify a set of tools to be provided to a device based on processing project information and/or a file to identify an attribute of the project.

In some implementations, the set of tools may include a set of software tools or applications, such as a set of tools related to a software development architecture. For example, the set of tools may include a development tool used to create/develop software and/or applications (e.g., an integrated development environment, a local server, a local database, etc.). As another example, the set of tools may include a build tool used with a collaborative developer project to manage source code, code quality, code versioning, and/or code deployment.

In some implementations, the set of tools may include a testing tool (e.g., a unit/functional testing tool). For example, the set of tools may include a tool to develop test scripts. In some implementations, the set of tools may include a tool related to runtime architecture services. For example, the set of tools may include a tool that provides re-usable libraries, which a developer can use to develop software and/or an application.

In some implementations, the set of tools may include tools to be provisioned on client device 220, server device 225 (e.g., a build server or a continuous integration server), and/or a VM, thereby enabling pre-configuration of a build server for use with continuous integration and/or continuous deployment pipelines. For example, provisioning system 205 may determine whether client device 220 and/or server device 225 is configured with a VM (e.g., a VM to be used during development of software and/or an application). In this case, provisioning system 205 may cause a VM to be configured on client device 220 and/or server device 225, such as when the VM is not configured on client device 220 and/or server device 225. Continuing, provisioning system 205 may provide information to client device 220 and/or server device 225 to enable the set of tools to be provisioned on client device 220 and/or server device 225 (e.g., in association with causing the VM to be configured on client device 220 and/or server device 225).

In some implementations, the set of tools may further include a set of tools related to infrastructure and/or operations architecture. For example, the set of tools may include a set of operations tools used to monitor metrics/health related to software and/or applications being developed. As another example, the set of tools may include a set of service virtualization tools, such as a set of tools used to test a third party library. As another example, the set of tools may include a set of tools to create and/or configure a virtual/computing environment.

In some implementations, provisioning system 205 may identify a set of libraries (e.g., rather than a set of tools). For example, provisioning system 205 may identify a set of libraries that includes pre-written code or runtime framework components (e.g. for particular functionality, such as login functionality, error handling functionality, encryption functionality, etc.) to be used to develop software and/or an application.

In some implementations, provisioning system 205 may identify an operating system (e.g., rather than a set of tools). For example, provisioning system 205 may identify an operating system to be installed on a VM (e.g., rather than a set of tools to be installed on client device 220).

In some implementations, provisioning system 205 may identify the set of tools using a data structure. For example, provisioning system 205 may identify the set of tools using a data structure that includes information identifying a set of tools associated with an attribute. In this case, provisioning system 205 may identify different sets of tools for the different attributes or the same set of tools for different attributes. As another example, provisioning system 205 may identify the set of tools using a data structure that includes information identifying particular client devices 220 on which sets of tools are to be provisioned.

As another example, provisioning system 205 may identify the set of tools based on a project specification or based on a role specified for the project. In this case, provisioning system 205 may identify different sets of tools for different roles for a project or the same set of tools for different roles. Additionally, or alternatively, provisioning system 205 may identify different sets of tools for different projects or the same set of tools for different projects.

As another example, provisioning system 205 may identify the set of tools based on information included in a file. For example, provisioning system 205 may identify the set of tools based on a CSV file or an excel file received from client device 220, rather than based on an attribute of the project.

In some implementations, provisioning system 205 may identify the set of tools using a model. For example, provisioning system 205 may train a model using various attributes for various projects related to particular client devices 220 that have attributes (e.g., attributes related to client device 220 and/or a user of client device 220). In some implementations, provisioning system 205 may use input from crowdsourcing to train the model. For example, provisioning system 205 may request that multiple client devices 220 and/or users of multiple client devices 220 identify attributes of a project, attributes of client devices 220 used during a project, and/or attributes of users of client devices 220. In some implementations, provisioning system 205 may use the identified attributes to train the model. In some implementations, provisioning system 205 may use the model to predict which sets of tools may be associated with a particular project, particular client devices 220, users of particular client devices 220, and/or the like.

In some implementations, provisioning system 205 may store information identifying the set of tools and a corresponding device. For example, provisioning system 205 may store information identifying the set of tools using a data structure or memory resources of provisioning system 205. As another example, provisioning system 205 may store information identifying the set of tools using server device 225 (e.g., to enable client device 220 to obtain the information identifying the set of tools and to request the set of tools).

In some implementations, provisioning system 205 may store the information identifying the set of tools in a manner such that the information is available for access (e.g., to client device 220). For example, provisioning system 205 may publish the information via server device 225 as a run-list. This enables server device 225 to push the information to client device 220 and/or enables client device 220 to request the information automatically, thereby conserving processing resources related to providing the information to client device 220.

In some implementations, provisioning system 205 may store information identifying which particular sets of tools are associated with which client devices 220. In this way, provisioning system 205 enables mapping of the particular sets of tools to particular client devices 220. This conserves processing resources related to identifying particular sets of tools associated with particular client devices 220.

In some implementations, provisioning system 205 may store scripts, such as automation scripts, associated with the set of tools (e.g., to be used by client device 220 to download, install, and/or configure the set of tools). For example, provisioning system 205 may store the scripts in a manner that permits the scripts to be requested by client device 220 based on the set of tools associated with client device 220. Continuing with the previous example, provisioning system 205 may store the scripts in a manner that permits a first client device 220 to request a first set of scripts for a first set of tools associated with the first client device 220 without requesting a different second set of scripts for a second set of tools associated with a second client device 220. This conserves processing resources by preventing client device 220 from requesting scripts for different client devices 220.

As further shown in FIG. 4, process 400 may include receiving, from the device, a request for the set of tools (block 440) and providing information associated with the set of tools to the device based on the request (block 450). For example, provisioning system 205 may receive the request for the set of tools (e.g., from client device 220 and/or server device 225), and may provide information associated with the set of tools to the device based on the request.

In some implementations, provisioning system 205 may receive the request (e.g., periodically, according to a schedule, etc.) from client device 220 and/or server device 225. For example, the request may include a request for a tool which client device 220 does not have. In some implementations, provisioning system 205 may receive the request when client device 220 and/or server device 225 obtains information from provisioning system 205 identifying the set of tools and determines that client device 220 does not have a tool of the set of tools. In this way, provisioning system 205 conserves processing resources by reducing or eliminating requests for tools which client device 220 already has.

In some implementations, client device 220 and/or server device 225 may have to register with provisioning system 205 prior to being permitted to request the set of tools. For example, client device 220 and/or server device 225 may have to provide credentials, such as a username, a password, a security identifier, a security token, or a digital certificate, to register with provisioning system 205 and/or to request the set of tools. This may increase security of providing the set of tools to client device 220 and/or server device 225.

In some implementations, provisioning system 205 may provide the requested set of tools to the client device (e.g., to enable client device 220 to install the set of tools). In some implementations, provisioning system 205 may provide a script (e.g., a program written in a scripting language) to enable client device 220 to obtain the set of tools and/or configure a setting or a parameter of the set of tools. For example, provisioning system 205 may provide a script which client device 220 and/or server device 225 executes to identify a storage location of files (e.g., installation files or other files) for the set of tools, download the files, and/or install the set of tools. As another example, provisioning system 205 may provide a script that enables client device 220 and/or server device 225 to configure the set of tools. In this case, the script may cause client device 220 to configure a continuous integration server, thereby reducing or eliminating the need for a user of client device 220 to configure the continuous integration server.

Additionally, or alternatively, provisioning system 205 may provide a file associated with the set of tools. For example, provisioning system 205 may provide a file (e.g., an executable file) that enables client device 220 and/or server device 225 to install the set of tools. Additionally, or alternatively, provisioning system 205 may provide a set of instructions for obtaining and/or configuring the set of tools.

In some implementations, provisioning system 205 may provide the requested set of tools to multiple client devices 220 (e.g., different client devices 220, client devices 220 with different operating systems, etc.). In this case, provisioning system 205 may enable parallel configuration of the set of tools on multiple client devices 220, thereby improving an efficiency of provisioning the set of tools on multiple client devices 220. In this way, provisioning system 205 reduces an amount of time needed to provision the set of tools on multiple client devices 220 and/or to provision different sets of tools on different client devices 220. Furthermore, provisioning system 205 enables provisioning of different sets of tools for client devices 220, such as with different operating systems, thereby increasing flexibility and/or scalability of provisioning sets of tools.

In some implementations, provisioning system 205 may identify the set of tools without receiving a request from client device 220. For example, provisioning system 205 may identify the set of tools and provide information related to the set of tools. In this case, provisioning system 205 can store information associated with capabilities and/or users of client device 220, such that provisioning system 205 may identify the set of tools to provide to client device 220.

Additionally, or alternatively, provisioning system 205 may provide (or publish) the set of tools. In this case, client device 220 may request the set of tools from provisioning system 205 based on the information provided or published by provisioning system 205 (e.g., based on client device 220 having information related to capabilities and/or users of client device 220). This conserves resources of provisioning system 205 by having client device 220 determine the set of tools needed by client device 220 (e.g., rather than having provisioning system 205 determine the set of tools).

In some implementations, provisioning system 205, client device 220, and/or server device 225 may install the set of tools (e.g., synchronize client device 220 and/or server device 225 with the information identifying the set of tools). For example, a software agent executing on client device 220 and/or server device 225 may download, compile, and/or install the set of tools using a script associated with the set of tools.

In some implementations, provisioning system 205, client device 220, and/or server device 225 may determine, when installing the set of tools, whether there are any dependencies associated with the set of tools and/or whether the dependencies have been satisfied. As an example of a dependency, client device 220 and/or server device 225 may identify software, an application, and/or a tool not included in the set of tools that may need to be installed prior to installation of the set of tools, such as by using information stored by provisioning system 205, client device 220, and/or server device 225, or information included in the script. For example, to install a web server on client device 220, client device 220 may first need to install a particular type of software platform. In some implementations, client device 220 and/or server device 225 may obtain scripts to install missing tools based on determining that there are dependencies for the set of tools and that the dependencies are not satisfied (e.g., prior to installing the set of tools).

In some implementations, provisioning system 205, client device 220 and/or server device 225 may configure a computing environment (e.g., a developer environment, a build environment, or a virtual environment similar to cloud computing environment 210) prior to, or in association with, installing the set of tools. This may permit installation of the set of tools within the environment, thereby causing client device 220 and/or server device 225 to configure the computing environment. In some implementations, provisioning system 205, client device 220, and/or server device 225 may configure different computing environments with different sets of tools. Additionally, or alternatively, provisioning system 205, client device 220, and/or server device 225 may configure a single computing environment or multiple computing environments. In this way, client device 220 and/or server device 225 enables configuration of different types computing environments.

In some implementations, provisioning system 205, client device 220 and/or server device 225 may handle exceptions and/or errors that occur during the installation of the set of tools. For example, provisioning system 205, client device 220 and/or server device 225 may handle exceptions and/or errors using software agent re-request scripts or providing an error notification for display. This improves an accuracy and/or efficiency of installing the set of tools by automatically handling exceptions and/or errors during installation.

In some implementations, client device 220, server device 225, and/or a user of client device 220 and/or server device 225 may use the set of tools to develop software and/or an application. For example, client device 220 and/or server device 225 may use the set of tools to provide code management services, a development environment, development tools, build tools, runtime architecture services, and/or the like. As another example, a user of client device 220 and/or server device 225 may use the set of tools installed on client device 220 and/or server device 225 to develop software and/or an application.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
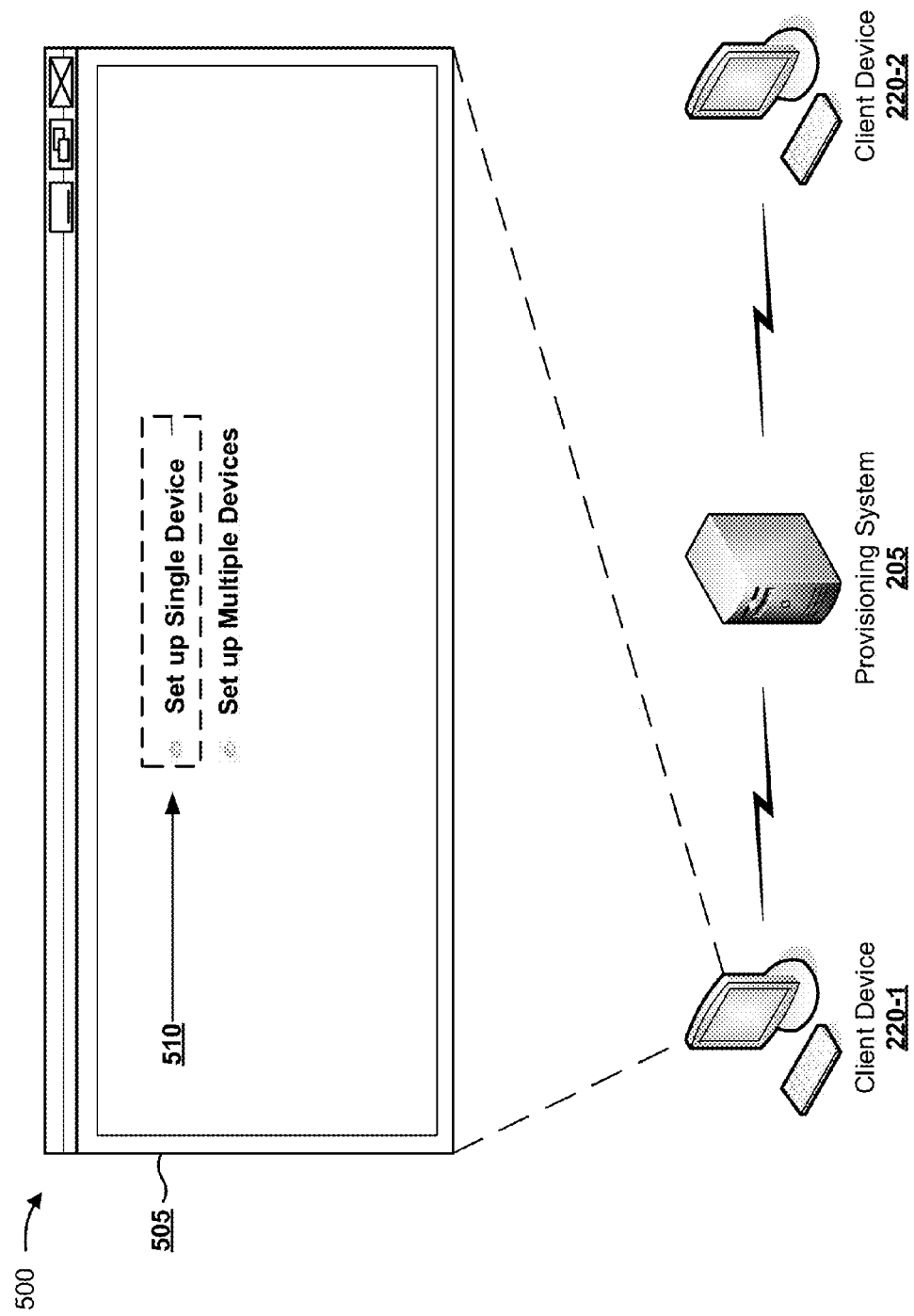

FIGS. 5A-5F are diagrams of an example implementation 500 relating to example process 400 shown in FIG. 4. As shown in FIG. 5A, example implementation 500 may include provisioning system 205, client device 220-1, and client device 220-2. As further shown in FIG. 5A, client device 220-1 may provide user interface 505, via which a user of client device 220-1 may facilitate provision of a set of tools (e.g., for client device 220-2). As shown, client device 220-1 may cause user interface 505 to prompt the user (e.g., via radio buttons) to select whether to set up a single device or multiple devices. In this case, as shown by reference number 510, the user may select "Set up Single Device".

Figure 5B:
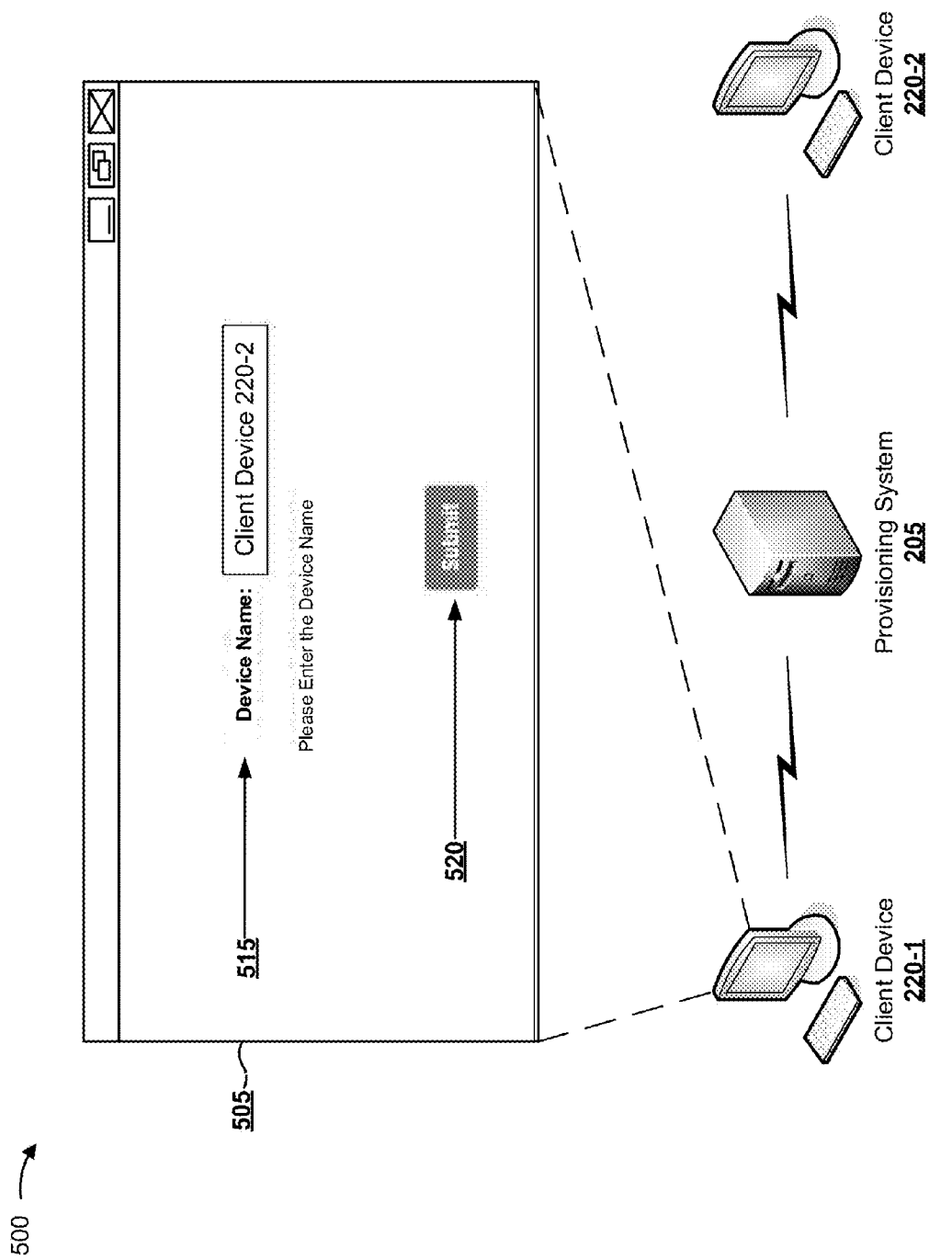

As shown in FIG. 5B, and as shown by reference number 515, client device 220-1 may cause user interface 505 to prompt the user to enter or select a device identifier that identifies the device (e.g., client device 220-2) on which the set of tools are to be provisioned. As shown by reference number 520, client device 220-1 may cause user interface 505 to prompt the user to select a "Submit" button to cause provisioning system 205 to receive the device identifier.

Figure 5C:
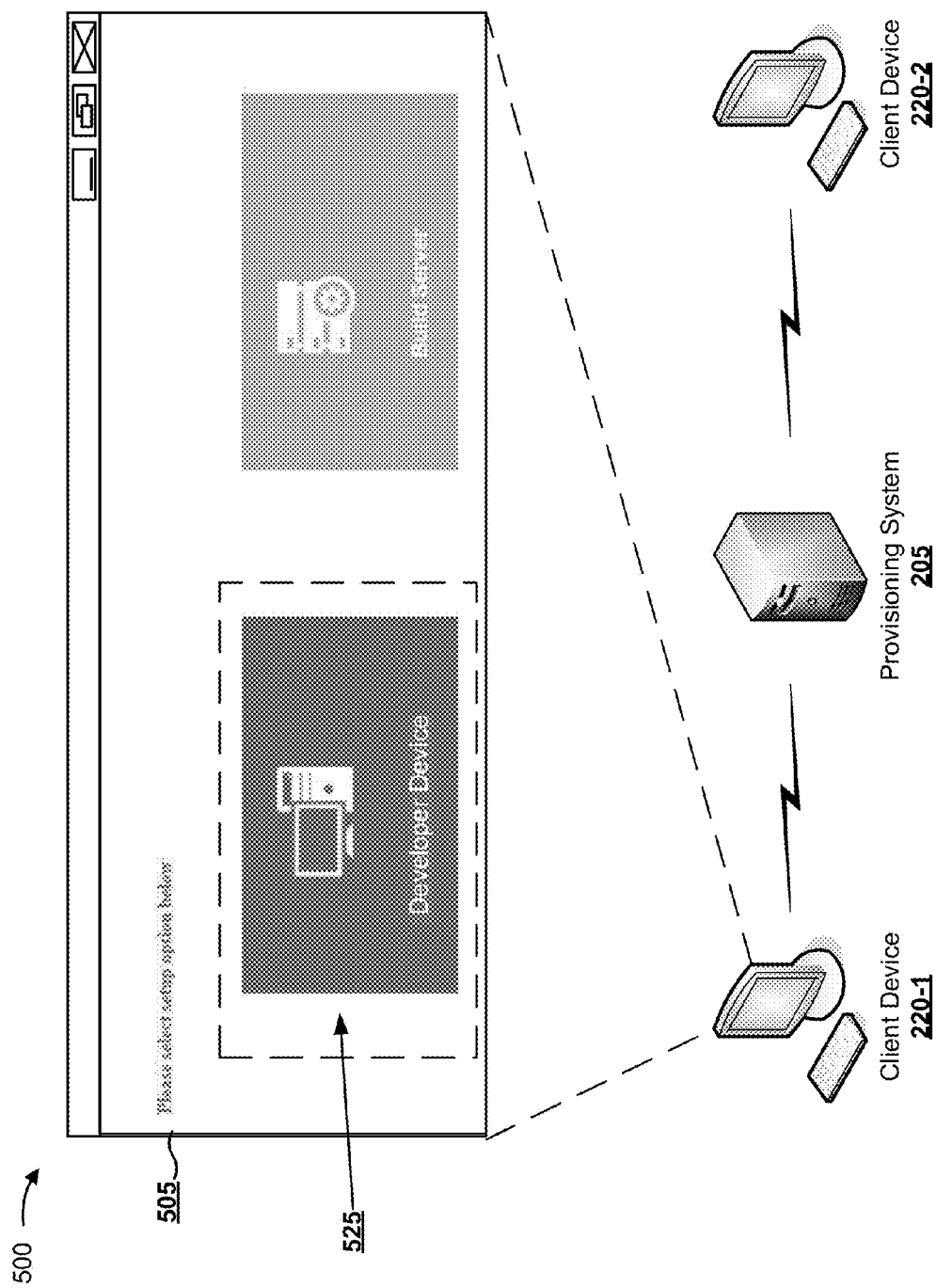

As shown in FIG. 5C, and as shown by reference number 525, client device 220-1 may cause user interface 505 to prompt the user to select the type of device for which the set of tools is to be provisioned (e.g., a developer device used by a software/application developer or a build server). For example, the user may select a developer device as the type of device for which the set of tools is to be being provisioned.

Figure 5D:
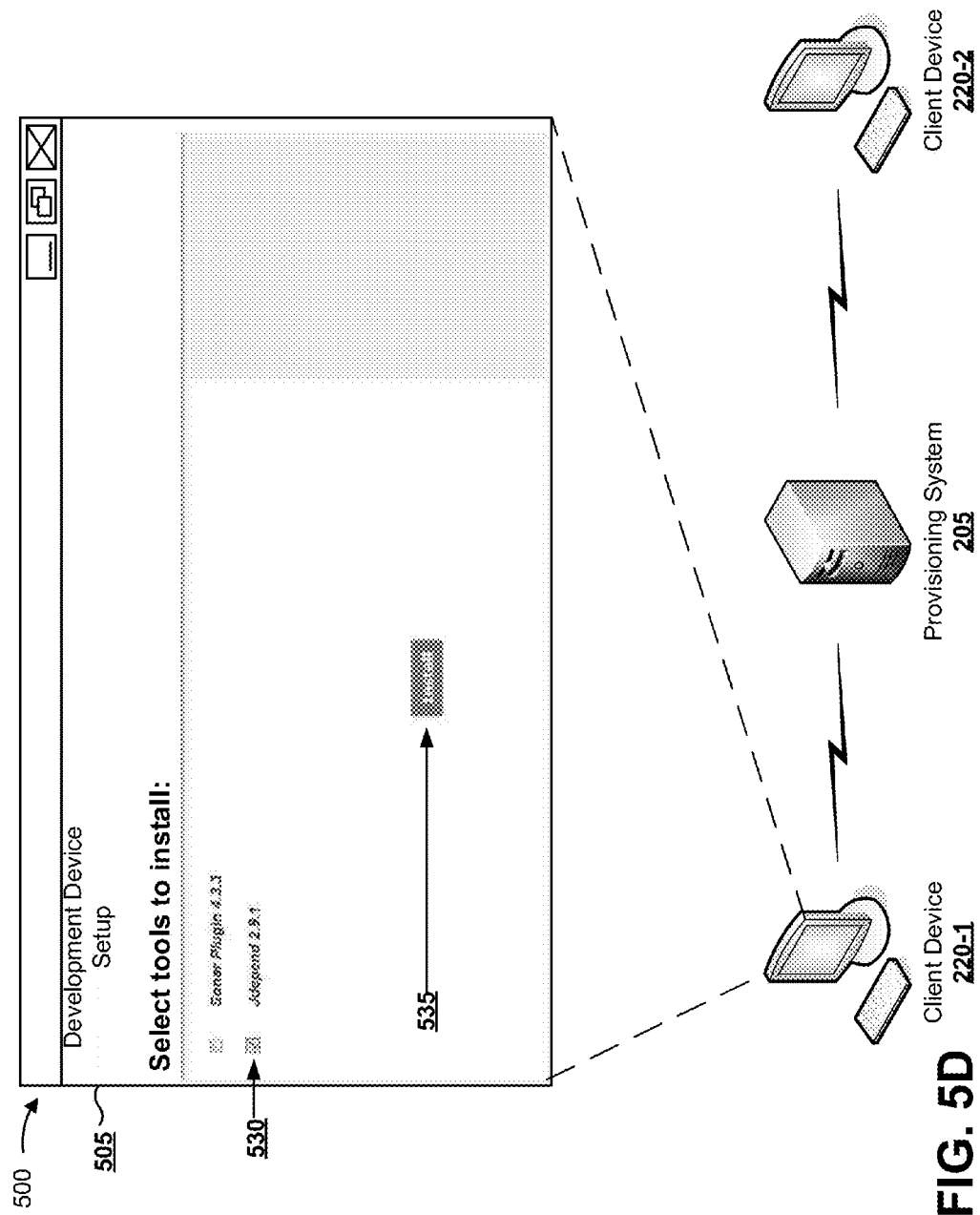

As shown in FIG. 5D, and as shown by reference number 530, client device 220-1 may cause user interface 505 to prompt the user to select the set of tools to provision. For example, the user may select a "Jdepend 2.9.1" tool as the set of tools to provision. As shown by reference number 535, client device 220-1 may cause user interface 505 to prompt the user to select an "Install" button.

Figure 5E:
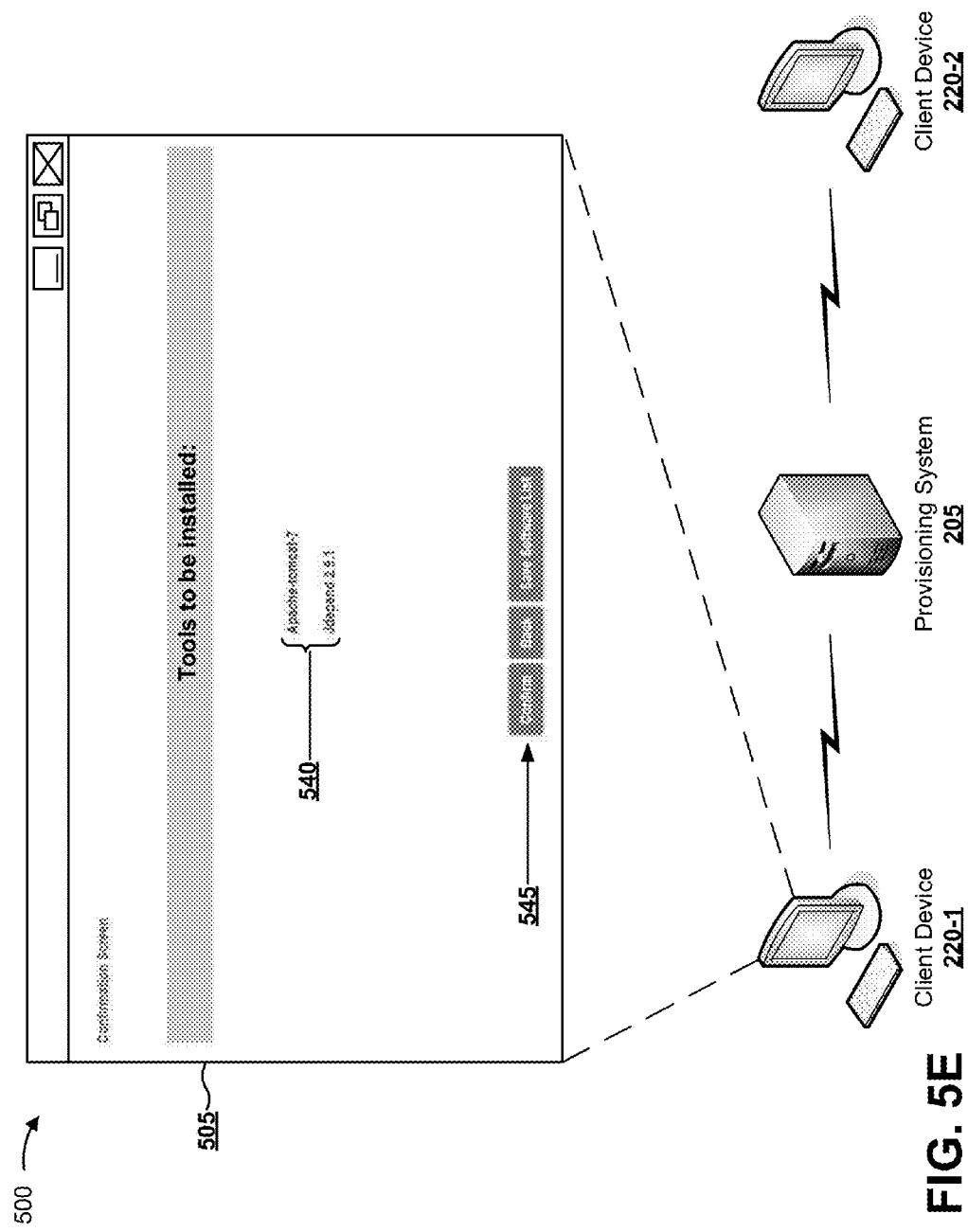

As shown in FIG. 5E, upon user selection of the install button, client device 220-1 may cause user interface 505 to display, as shown by reference number 540, the selected tools and any additional tools that need to be installed (e.g., based on dependencies of the selected tools). As shown by reference number 545, user selection of the install button may cause user interface 505 to prompt the user to confirm installation (e.g., via selection of a "Confirm" button), which may then cause the set of tools to be provisioned.

As shown in FIG. 5F, and as shown by reference number 550, client device 220-1 may provide, to provisioning system 205, the information associated with the tools to install. As shown by reference number 555, provisioning system 205 may cause the tools to be installed (e.g., based on receiving the information from client device 220-1). As shown by reference number 560, provisioning system 205 may provide scripts to client device 220-2 (e.g., to enable client device 220-2 to automatically install and/or configure the set of tools). As shown by reference number 565, client device 220-2 may then use the scripts to install and/or configure the set of tools.

As indicated above, FIGS. 5A-5F are provided merely as an example. Other examples are possible and may differ from what was described with regard to FIGS. 5A-5F.

Figure 6A:
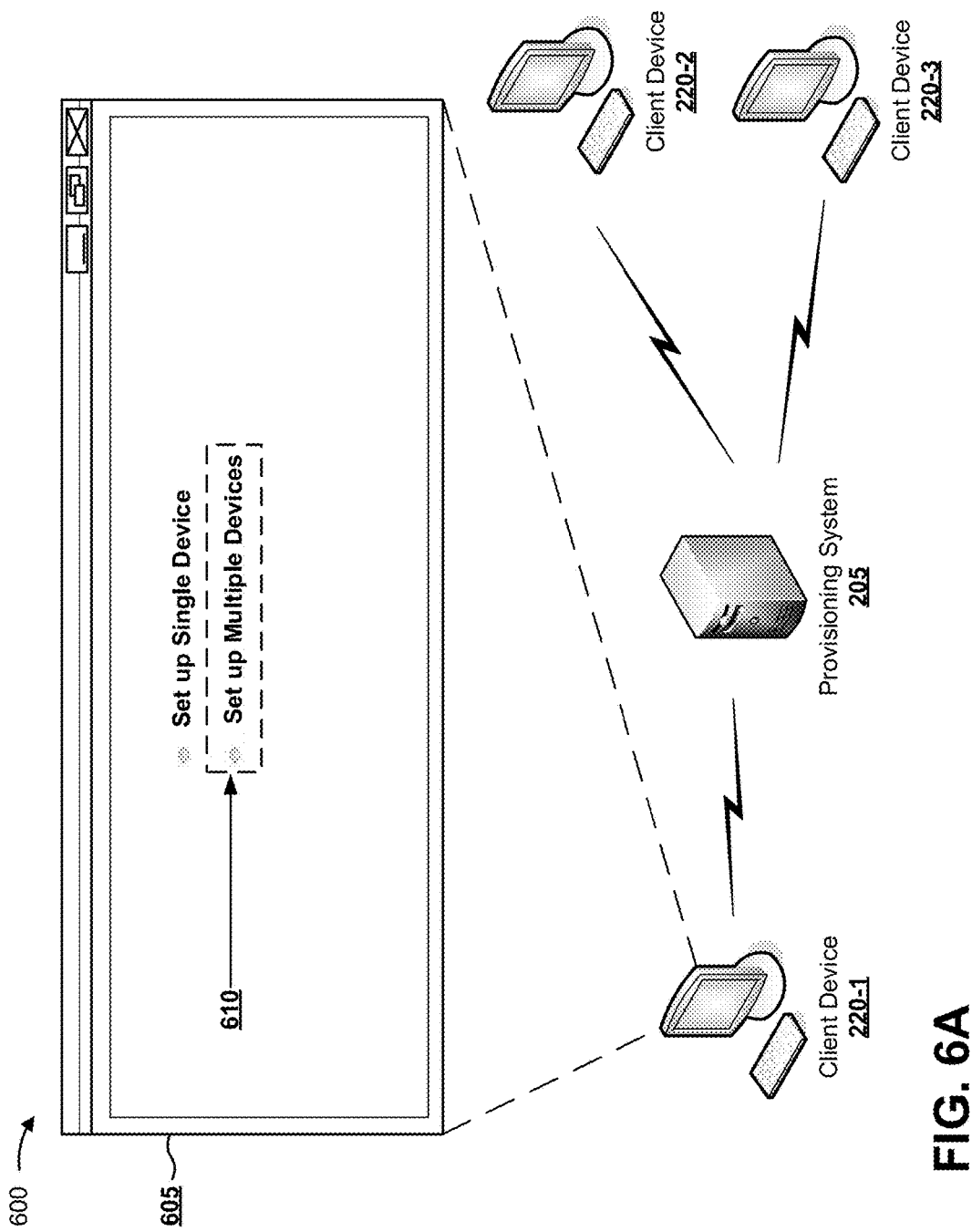

FIGS. 6A-6F are diagrams of an example implementation 600 relating to example process 400 shown in FIG. 4. As shown in FIG. 6A, example implementation 600 may include client device 220-1, client device 220-2, client device 220-3, and provisioning system 205. As further shown in FIG. 6A, client device 220-1 may provide user interface 605, via which a user of client device 220-1 may facilitate provision of a set of tools (e.g., for client device 220-2 and client device 220-3). As further shown, client device 220-1 may cause user interface 605 to prompt the user (e.g., via radio buttons) to select whether to set up a single device or multiple devices. As shown by reference number 610, in this case, the user may select "Set up Multiple Devices" to set up multiple client devices 220.

Figure 6B:
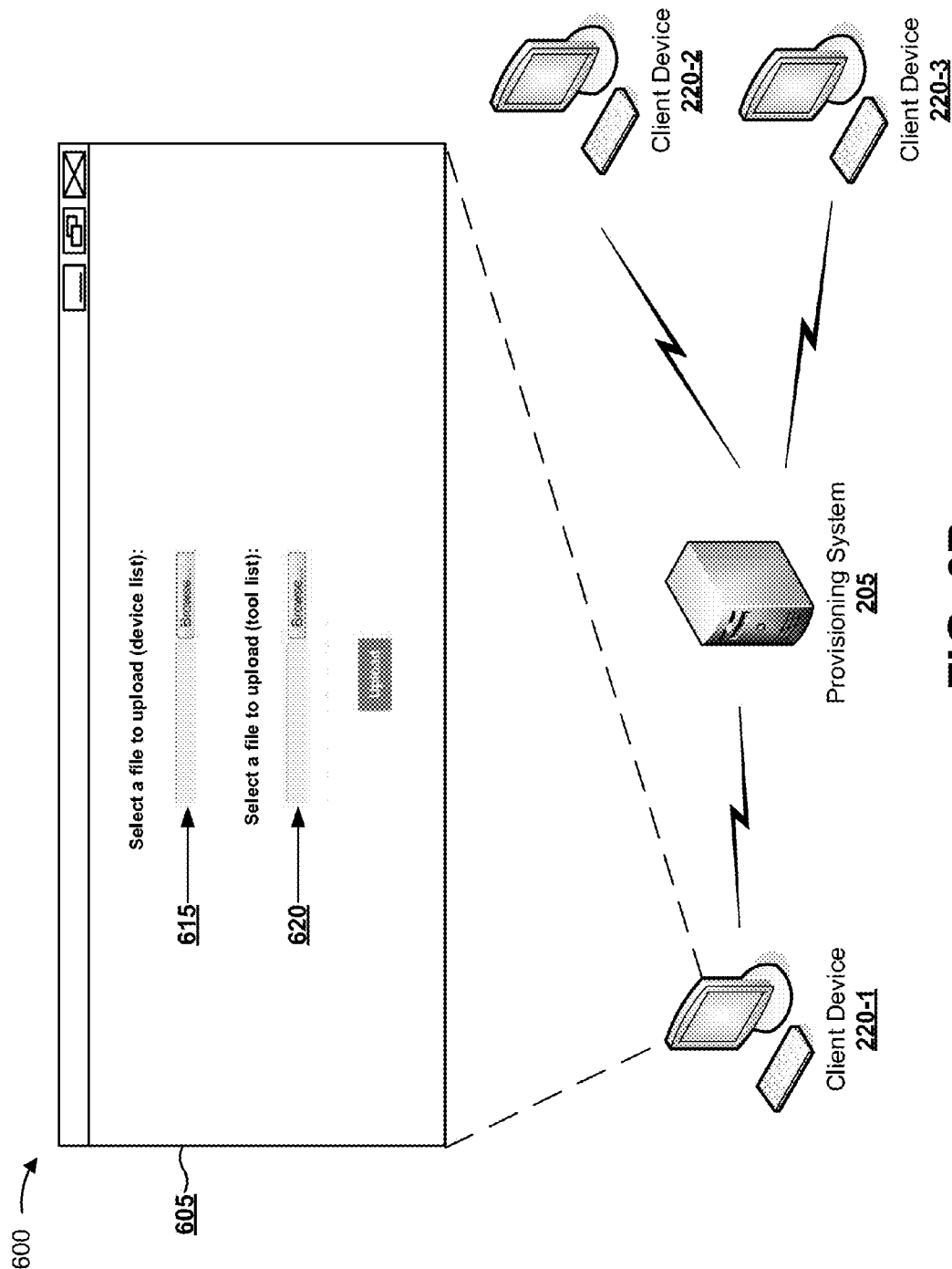

As shown in FIG. 6B, and as shown by reference number 615, client device 220-1 may cause user interface 605 to prompt the user to select a device list file to upload. For example, user interface 605 may prompt the user to select a CSV file, or an excel file, that includes device identifiers identifying client devices 220 on which a set of tools is to be provisioned. As shown by reference number 620, client device 220-1 may cause user interface 605 to prompt the user to select a tool list file to upload. For example, user interface 605 may prompt the user to select a CSV file, or an excel file, that includes tool identifiers identifying a set of tools to be provisioned on one or more client devices 220.

Figure 6C:
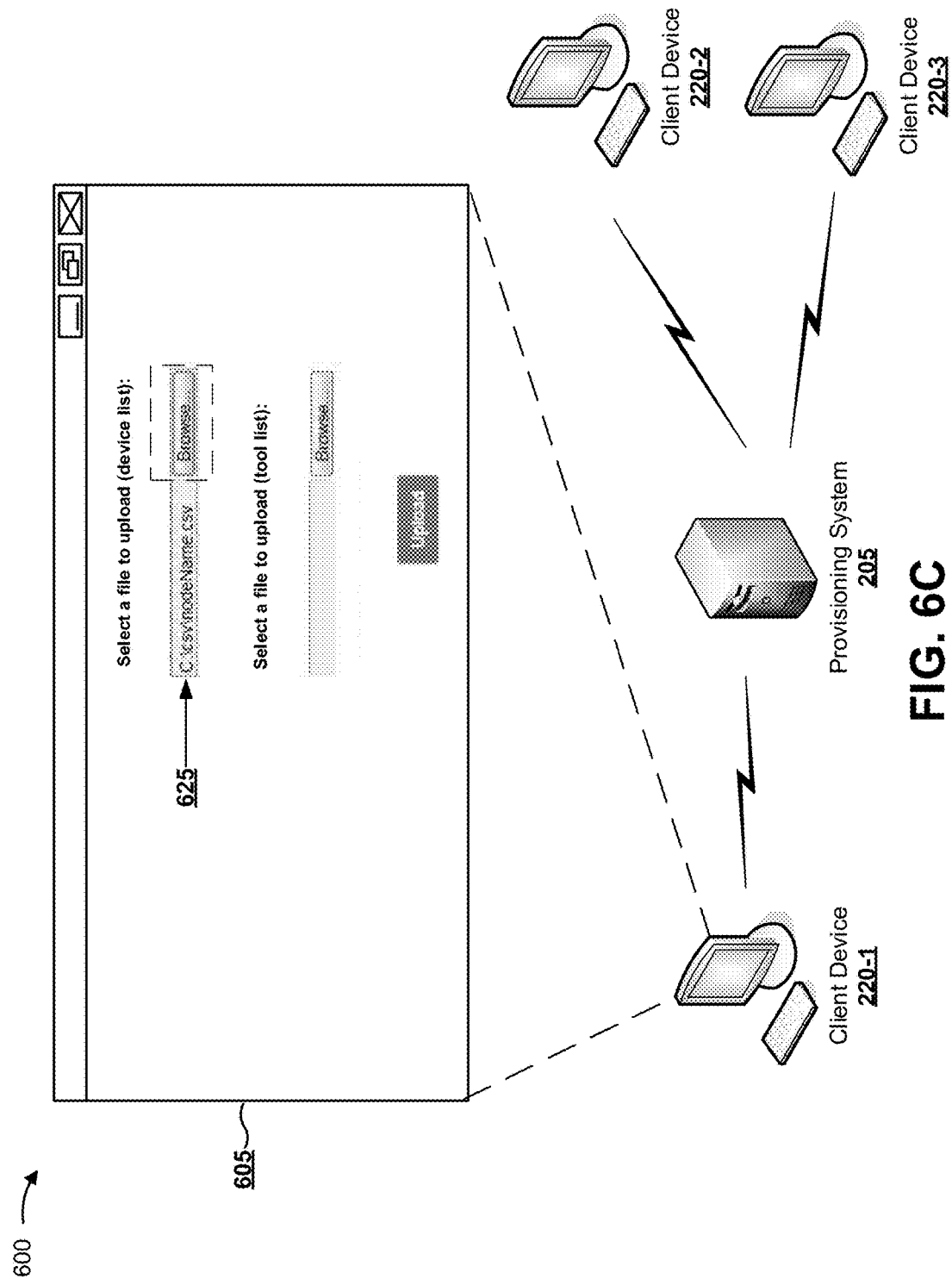
Figure 6D:
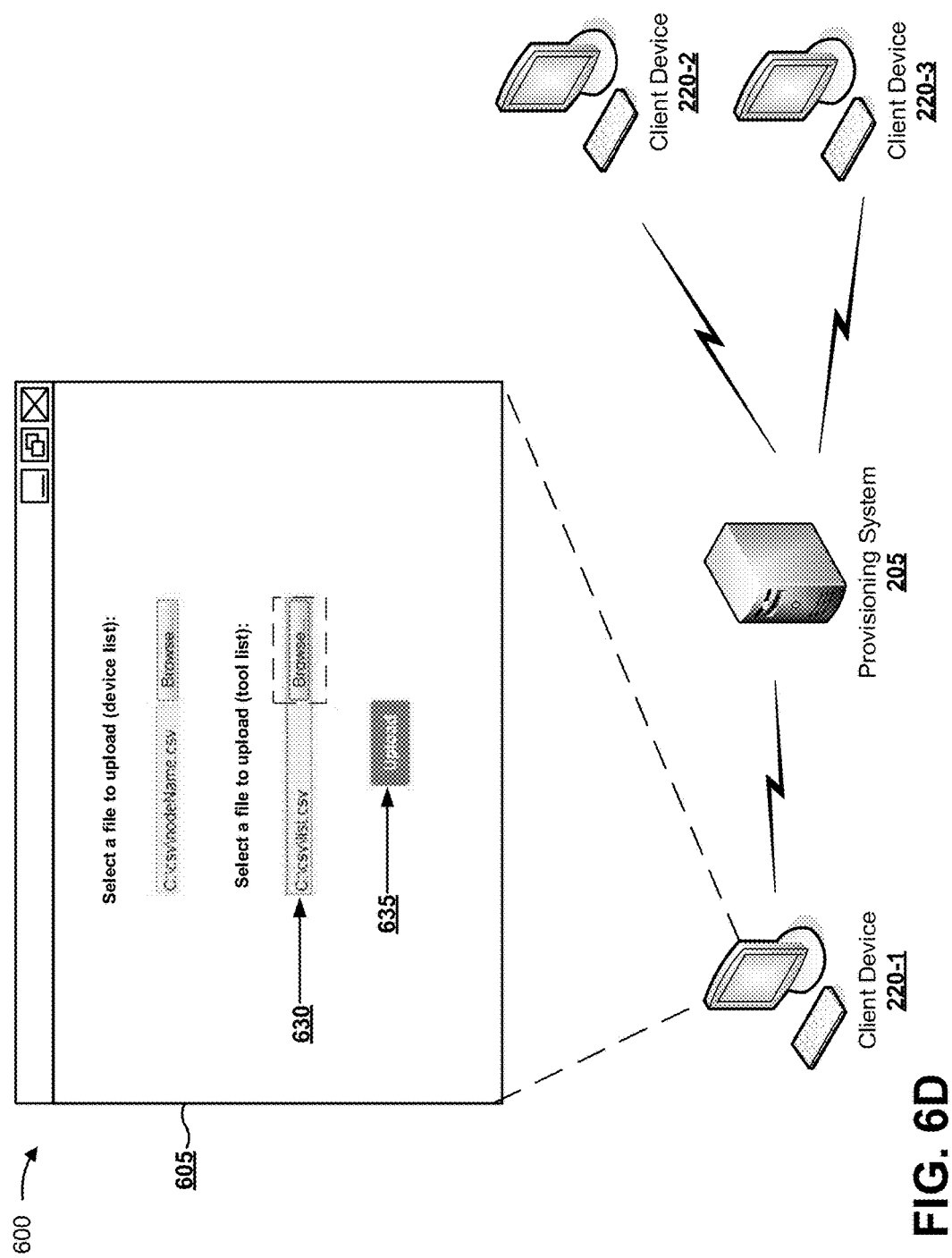

As shown in FIG. 6C, and as shown by reference number 625, the user may browse one or more files to select the device list file. For example, the user may use a file selection dialog, a file browser, or a file manager to browse the one or more files and select the device list file. As shown in FIG. 6D, and as shown by reference number 630, the user may browse one or more files to select the tool list file. For example, the user may use a file selection dialog, a file browser, or a file manager to browse the one or more files and select the tool list file. As shown by reference number 635, the user may upload the device list file and the tool list file (e.g., to provisioning system 205) by selecting an "Upload" button displayed by user interface 605.

Figure 6E:
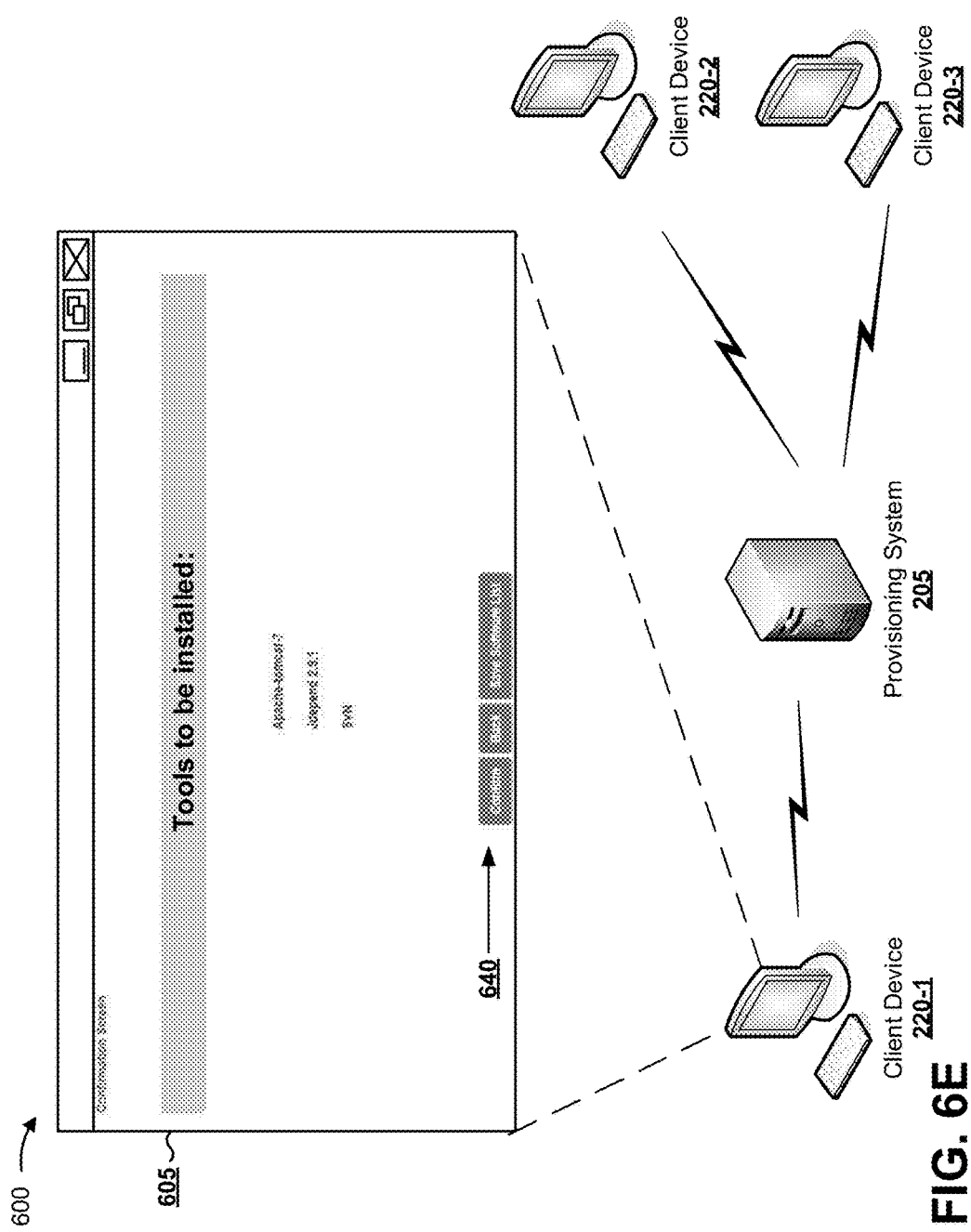

As shown in FIG. 6E, upon user selection of the device list file and the tool list file, client device 220-1 may cause user interface 605 to display the tools to be installed. As further shown in FIG. 6E, and by reference number 640, client device 220-1 may prompt the user to confirm installation of the set of tools, which may then cause the set of tools to be provisioned.

Figure 6F:
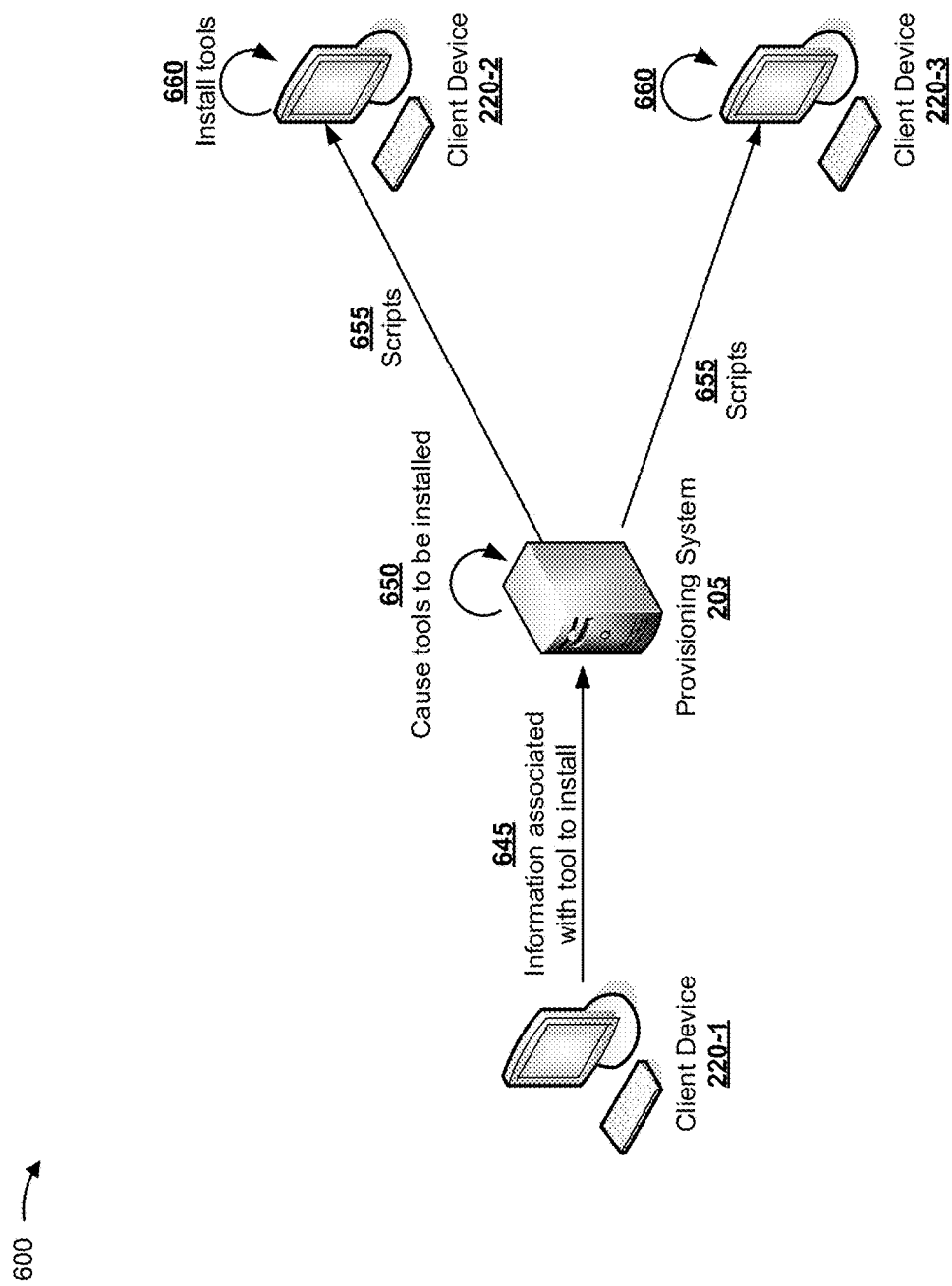

As shown in FIG. 6F, and as shown by reference number 645, client device 220-1 may provide, to provisioning system 205, the information associated with the tools to install. As shown by reference number 650, provisioning system 205 may cause the tools to be installed (e.g., based on receiving the information from client device 220-1). As shown by reference number 655, provisioning system 205 may provide scripts to client device 220-2 and to client device 220-3 (e.g., to enable client devices 220-2 and 220-3 to install and/or configure the set of tools in parallel). As shown by reference number 660, client device 220-2 and client device 220-3 may use the scripts to install and/or configure the set of tools.

As indicated above, FIGS. 6A-6F are provided merely as an example. Other examples are possible and may differ from what was described with regard to FIGS. 6A-6F.

Implementations described herein provide a provisioning system that may automatically identify a set of tools needed by a development team based on project requirements. Further, the provisioning system may dynamically and automatically provision the set of tools on client devices of members of the development team. Additionally, the provisioning system may cause parallel installation of different sets of tools on different client devices.

In this way, the provisioning system increases an efficiency of dynamically installing different sets of tools. For example, the provisioning system conserves memory resources by reducing or eliminating installation of tools that are not needed. Additionally, or alternatively, the provisioning system conserves processing resources by reducing or eliminating installation of tools that are not needed, such as tools that are not needed for particular roles, projects, and/or the like. Furthermore, the provisioning system reduces an amount of time needed to install sets of tools on multiple client devices by enabling parallel installation on different client devices, thereby increasing an efficiency of installing sets of tools on different client devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
one or more memories; and
one or more processors, communicatively coupled to the one or more memories, to:
receive project information associated with a project,
the project information including information related to:
a set of specifications associated with the project, and
a set of descriptions associated with roles for the project;
process the project information to identify an attribute of the project based on receiving the project information,
the attribute of the project being identified based on at least one of:
natural language processing,
machine learning, or
artificial intelligence;
identify a first device used to develop at least one of software or an application;
identify a second device used to manage development of at least one of the software or the application;
identify a third device used to test at least one of the software or the application;

identify a set of tools to be provisioned on each of the first device, the second device, and the third device based on processing the project information,
  each of the set of tools being associated with the set of specifications and the set of descriptions,
  each of the set of tools being different for the first device, the second device, and the third device,
  each of the set of tools being identified based upon a trained model,
    the trained model being trained based on input from crowdsourcing;
receive, from the first device, the second device, and the third device, a request for the set of tools;
identify a set of scripts associated with the set of tools,
  the set of scripts to obtain or configure the set of tools;
provide the set of scripts associated with the set of tools to the first device, the second device, and the third device based on the request; and
cause installation or configuration of the set of tools by executing the set of scripts on the first device, the second device, and the third device,
  the installation or configuration of the set of tools to occur in parallel.

2. The device of claim 1, where the one or more processors are further to:
determine whether the set of tools depends on one or more other tools to be configured on the first device, the second device, and the third device; and
identify the one or more other tools based on determining whether the set of tools depends on the one or more other tools.

3. The device of claim 1, where the one or more processors, when identifying the set of tools, are to:
identify a first set of tools for a first role associated with the project; and
identify a second set of tools for a second role associated with the project,
  the first role being different from the second role,
  the first set of tools being different from the second set of tools.

4. The device of claim 1, where:
a first set of tools is associated with a first virtual environment of the device, and
a second set of tools is associated with a second virtual environment of the device.

5. The device of claim 1, where the one or more processors are further to:
utilize the attribute to train the trained model.

6. The device of claim 1, where the set of tools comprise:
a first tool to develop or create software or an application,
a second tool to maintain code versioning, code quality, or code deployment,
a third tool to develop a test script to test the software or the application,
a fourth tool to monitor health of the software or the application, or
a fifth tool to test a library.

7. The device of claim 1, where the set of tools include one or more libraries related to the project.

8. A method, comprising:
receiving, by a device, project information associated with a project,
  the project information identifying an attribute of the project related to:
    a specification of the project, or
    a role associated with the project;
processing, by the device, the project information to identify the attribute of the project,
  the attribute of the project being identified based on at least one of:
    natural language processing,
    machine learning, or
    artificial intelligence;
identifying, by the device, a first device used to develop at least one of software or an application;
identifying, by the device, a second device used to manage development of at least one of the software or the application;
identifying, by the device, a third device used to test at least one of the software or the application;
identifying, by the device, one or more tools for each of the first device, the second device, and the third device based on identifying the attribute of the project,
  each of the one or more tools being different for the first device, the second device, and the third device,
  each of the one or more tools being identified based upon a trained model,
    the trained model being trained based on input from crowdsourcing;
receiving, from the first device, the second device, and the third device, a request for the one or more tools for the first device, the second device, and the third device;
identifying, by the device, a set of scripts associated with the one or more tools, the set of scripts to obtain or configure the one or more tools;
providing, by the device, the set of scripts to permit the first device, the second device, and the third device to obtain or install the one or more tools; and
causing, by the device, installation or configuration of the one or more tools on the first device, the second device, and the third device by executing the set of scripts,
  the installation or configuration to occur in parallel.

9. The method of claim 8, further comprising:
identifying additional tools associated with the one or more tools requested by the first device, the second device, and the third device;
determining whether the first device, the second device, and the third device have the additional tools based on identifying the additional tools; and
providing information associated with the additional tools to permit the first device, the second device, and the third device to obtain the additional tools based on determining whether the first device, the second device, and the third device have the additional tools.

10. The method of claim 8, where the one or more tools comprise:
a first tool to develop or create software or an application,
a second tool to maintain code versioning, code quality, or code deployment,
a third tool to develop a test script to test the software or the application,
a fourth tool to monitor health of the software or the application, or
a fifth tool to test a library.

11. The method of claim 8, further comprising:
provisioning a virtual environment on the first device; and
where identifying the one or more tools comprises:
  identifying the one or more tools based on provisioning the virtual environment, the one or more tools to be used within the virtual environment.

12. The method of claim 8, where the one or more tools include one or more libraries related to the project.

13. The method of claim 8, further comprising:

utilizing the attribute to train the trained model.

14. The method of claim 8, where the one or more tools are related to multiple virtual environments or multiple operating systems.

15. A non-transitory computer-readable medium storing instructions, the instructions comprising:
one or more instructions that, when executed by one or more processors, cause the one or more processors to:
receive project information that identifies a set of tools to be provisioned on multiple devices,
the multiple devices to be used during a project;
process the project information to identify an attribute of the project based on receiving the project information,
the attribute of the project being identified based on at least one of:
natural language processing,
machine learning, or
artificial intelligence;
identify a first device, of the multiple devices, used to develop at least one of software or an application;
identify a second device, of the multiple devices, used to manage development of at least one of the software or the application;
identify a third device, of the multiple devices, used to test at least one of the software or the application;
process the project information to identify the set of tools based on receiving the project information,
the set of tools including different tools associated with different roles related to the project,
each of the set of tools being different for each of the first device, the second device, and the third device,
each of the set of tools being identified based upon a trained model,
the trained model being trained based on input from crowdsourcing;
identify a set of scripts associated with the set of tools, the set of scripts to obtain or configure the set of tools;
provide set of scripts related to installing or configuring the set of tools on the first device, the second device, and the third device based on processing the project information; and
cause installation or configuration of the set of tools on the first device, the second device and the third device by executing the set of scripts,
the installation or configuration to occur in parallel.

16. The non-transitory computer-readable medium of claim 15, where the one or more instructions, when executed by the one or more processors, further cause the one or more processors to:
publish information identifying the set of tools based on identifying the set of tools; and
receive multiple requests based on publishing the information identifying the set of tools.

17. The non-transitory computer-readable medium of claim 15, where the set of tools is related to multiple virtual environments or multiple operating systems.

18. The non-transitory computer-readable medium of claim 15, where the one or more instructions, when executed by the one or more processors, further cause the one or more processors to:
determine whether the first device is configured with a virtual machine to use the set of tools;
cause the virtual machine to be installed or configured on the first device based on determining that the first device is not configured with the virtual machine; and
where the one or more instructions, that cause the one or more processors to provide the set of scripts, cause the one or more processors to:
provide the set of scripts based on causing the virtual machine to be installed or configured on the first device.

19. The non-transitory computer-readable medium of claim 15, where the one or more instructions, when executed by the one or more processors, further cause the one or more processors to:
utilize the attribute to train the trained model.

20. The non-transitory computer-readable medium of claim 15, where the set of tools comprise:
a first tool to develop or create software or an application,
a second tool to maintain code versioning, code quality, or code deployment,
a third tool to develop a test script to test the software or the application,
a fourth tool to monitor health of the software or the application, or
a fifth tool to test a library.

* * * * *